United States Patent
Kishi et al.

(10) Patent No.: US 10,466,636 B2
(45) Date of Patent: Nov. 5, 2019

(54) IMAGE FORMING APPARATUS THAT ADJUSTS COLOR MISREGISTRATION

(71) Applicant: CANON KABUSHIKI KAISHA, Tokyo (JP)

(72) Inventors: Takehiro Kishi, Toride (JP); Hirotoshi Tajima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/974,745

(22) Filed: May 9, 2018

(65) Prior Publication Data

US 2018/0335740 A1 Nov. 22, 2018

(30) Foreign Application Priority Data

May 16, 2017 (JP) .................. 2017-097515
Jul. 3, 2017 (JP) .................. 2017-130520

(51) Int. Cl.
*G03G 15/00* (2006.01)
*G03G 15/01* (2006.01)
*H04N 1/50* (2006.01)
*G03G 15/041* (2006.01)
*G03G 15/04* (2006.01)

(52) U.S. Cl.
CPC ..... *G03G 15/5054* (2013.01); *G03G 15/0184* (2013.01); *G03G 15/0189* (2013.01); *G03G 15/0415* (2013.01); *G03G 15/5058* (2013.01); *H04N 1/506* (2013.01); *G03G 15/04036* (2013.01); *G03G 2215/0161* (2013.01)

(58) Field of Classification Search
CPC .................................. G03G 15/5054
USPC .......................................... 399/301
See application file for complete search history.

(56) References Cited

U.S. PATENT DOCUMENTS

| | | | |
|---|---|---|---|
| 4,531,828 A | 7/1985 | Hoshino | |
| 9,104,127 B2* | 8/2015 | Yamaguchi | ........ G03G 15/5054 |
| 2001/0017645 A1* | 8/2001 | Toda | ...................... H04N 1/047 347/116 |
| 2004/0175196 A1* | 9/2004 | Yamamoto | ......... G03G 15/0194 399/49 |
| 2005/0036799 A1* | 2/2005 | Tomita | ................... G03G 15/50 399/49 |

FOREIGN PATENT DOCUMENTS

| | | |
|---|---|---|
| JP | 59-182139 A | 10/1984 |
| JP | 2000-293084 A | 10/2000 |
| JP | 2002-014507 A | 1/2002 |

* cited by examiner

*Primary Examiner* — Quana Grainger
(74) *Attorney, Agent, or Firm* — Venable LLP

(57) ABSTRACT

An image forming apparatus includes a controller configured to control first and second image forming units to form a plurality of groups of detection images, the plurality of groups of detection images being scaled based on a scaling factor, determine a plurality of detection start timings that respectively correspond to the plurality of groups based on the scaling factor, control a detection unit to detect the plurality of groups based on the determined detection start timings, and control the detected misregistration of a first image to be formed by the first image forming unit and a second image to be formed by the second image forming unit.

20 Claims, 20 Drawing Sheets

FIG. 5A
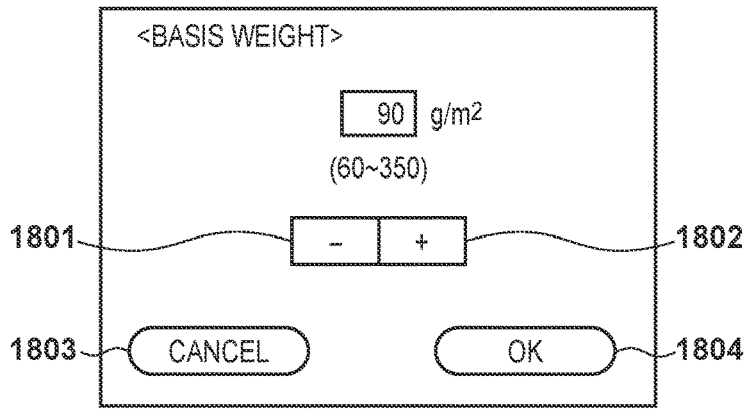
FIG. 5B
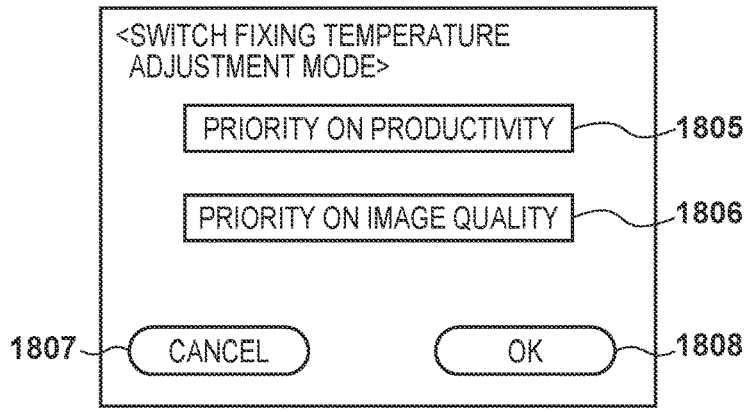
FIG. 5C
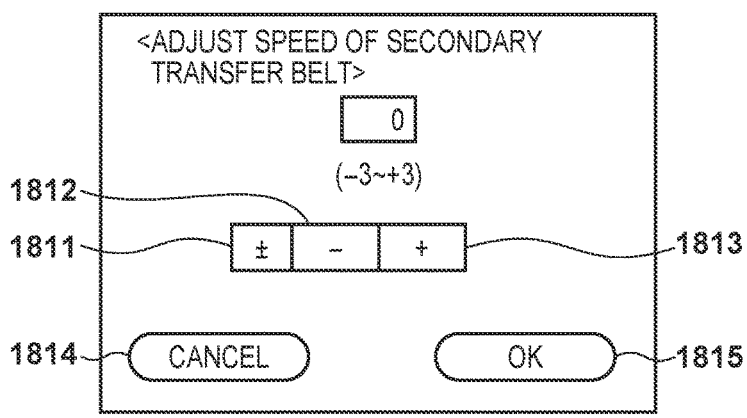
FIG. 5D
| BASIS WEIGHT | IMAGE QUALITY PRIORITY MODE | PRODUCTIVITY PRIORITY MODE |
|---|---|---|
| LESS THAN 150 gsm | 150 DEGREES | 160 DEGREES |
|  | 0.60% | 0.60% |
| 150 gsm OR MORE | 170 DEGREES | 160 DEGREES |
|  | 1.50% | 0.60% |

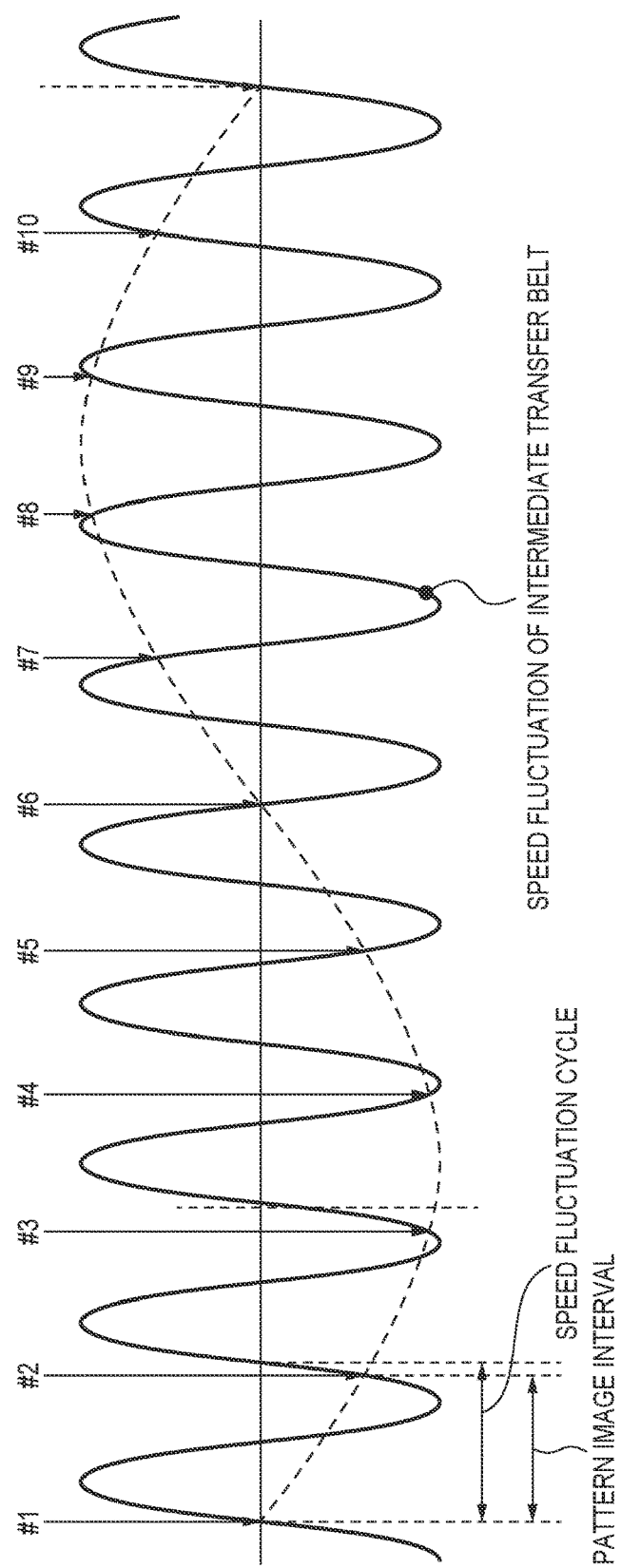

IMAGE FORMING APPARATUS THAT ADJUSTS COLOR MISREGISTRATION

BACKGROUND OF THE INVENTION

Field of the Invention

The present invention relates to color registration adjustment.

Description of the Related Art

For example, in an image forming apparatus that uses an electrophotographic method, light is radiated toward a charged photosensitive member via a deflector, thereby forming a latent image on the photosensitive member. The photosensitive member is provided for each color used in image formation. By developing a latent image on each photosensitive member using toner of a corresponding color, toner images of different colors are formed on different photosensitive members. After transferring these toner images sequentially to an intermediate transfer member, the image forming apparatus collectively transfers them from the intermediate transfer member to a sheet. Note that a color image is formed by transferring the toner images formed on the photosensitive members to the intermediate transfer member in such a manner that the toner images overlap one another. Here, relative misregistration may occur in transfer positions of the toner images on the intermediate transfer member. This phenomenon, called color misregistration, is one of the factors that determine the grade of an image. One factor contributing to color misregistration is a speed fluctuation of a moving speed of the surface of the intermediate transfer member caused by eccentricity of a driving roller that drives the intermediate transfer member.

An image forming apparatus described in U.S. Pat. No. 4,531,828 reduces color misregistration attributed to eccentricity of a driving roller by setting the interval between transfer positions from photosensitive members to an intermediate transfer member to an integral multiple of the circumferential length of the driving roller. On the other hand, an image forming apparatus described in Japanese Patent Laid-Open No. 2000-293084 forms pattern images on an intermediate transfer member, and corrects color misregistration based on the result of detection of the pattern images (color registration adjustment). Note that due to a speed fluctuation of an intermediate transfer belt caused by eccentricity of a driving roller, the result of detection of color misregistration fluctuates depending on the formation positions of the pattern images on the intermediate transfer belt. For this reason, an image forming apparatus described in Japanese Patent Laid-Open No. 2002-14507 forms a plurality of groups of pattern images, and corrects color misregistration based on an average value of the result of detection of the pattern images in each group.

In an image forming apparatus, the length (scaling factor) in a sub scanning direction of images formed on an intermediate transfer member is adjusted in some cases. As one example, in order to enhance the transfer efficiency, there is a case where a speed difference is created by making the circumferential speed of the intermediate transfer member differ from the conveyance speed of a sheet at a transfer position of toner images from the intermediate transfer member to the sheet. When there is a speed difference at the transfer position, the toner images on the intermediate transfer member are enlarged/reduced in the sub scanning direction in accordance with the speed difference when transferred to the sheet. In order to set the length in the sub scanning direction of the toner images transferred to the sheet to a target value, it is necessary to adjust the length (scaling factor) in the sub scanning direction of toner images formed on photosensitive members in accordance with the speed difference at the transfer position of the toner images on the sheet.

As a method of adjusting the scaling factor in the sub scanning direction, for example, a method of adjusting the rotation speed of a polygon mirror is known. Specifically, if the rotation speed of the polygon mirror is reduced, the interval between scanning lines will increase, and the toner images formed on the photosensitive members will be enlarged in the sub scanning direction. On the other hand, if the rotation speed of the polygon mirror is increased, the interval between scanning lines will decrease, and the toner images formed on the photosensitive members will be reduced in the sub scanning direction. Incidentally, changing the rotation speed of the polygon mirror will change write timings of the images. Therefore, when the rotation speed of the polygon mirror has been changed, the image forming apparatus needs to execute color registration adjustment. However, when the image write timings have been changed, the formation positions of a plurality of pattern images on an intermediate transfer belt also fluctuate. This gives rise to the possibility that the image forming apparatus cannot execute color registration adjustment with high precision.

SUMMARY OF THE INVENTION

According to an aspect of the present invention, an image forming apparatus, includes: a conveyance unit configured to convey a sheet; a setting unit configured to set a scaling factor in a conveyance direction of the sheet; a first image forming unit configured to form, on an intermediate transfer member, a first image of a first color, the first image being scaled based on the scaling factor; a second image forming unit configured to form, on the intermediate transfer member, a second image of a second color different from the first color, the second image being scaled based on the scaling factor; a transfer portion at which the first image and the second image are transferred from the intermediate transfer member to the sheet; a detection unit configured to detect a group of detection images formed on the intermediate transfer member, the group of detection images including a first detection image of the first color and a second detection image of the second color and being used to detect color misregistration; and a controller. The controller is configured to: control the first image forming unit and the second image forming unit to form a plurality of groups of detection images, the plurality of groups of detection images being scaled based on the scaling factor, determine a plurality of detection start timings that respectively correspond to the plurality of groups based on the scaling factor, control the detection unit to detect the plurality of groups based on the determined detection start timings, and control the detected control color misregistration of a first image to be formed by the first image forming unit and a second image to be formed by the second image forming unit.

Further features of the present invention will become apparent from the following description of exemplary embodiments with reference to the attached drawings.

BRIEF DESCRIPTION OF THE DRAWINGS

FIGS. 5A to 5C are schematic diagrams of setting screens.

FIG. 5D is diagram showing fixing temperatures and circumferential speed differences in correspondence with basis weights of sheets.

FIG. 8 is a diagram for describing the reason why a plurality of pattern images are formed.

DESCRIPTION OF THE EMBODIMENTS

First Embodiment

The following describes an exemplary embodiment of the present invention with reference to the drawings. Note that the following embodiment is an example, and the present invention is not limited to the content of the embodiment. Furthermore, in each drawing presented below, constituent elements that are not necessary for the description of the embodiment are omitted.

(Image Forming Apparatus)

Figure 1:
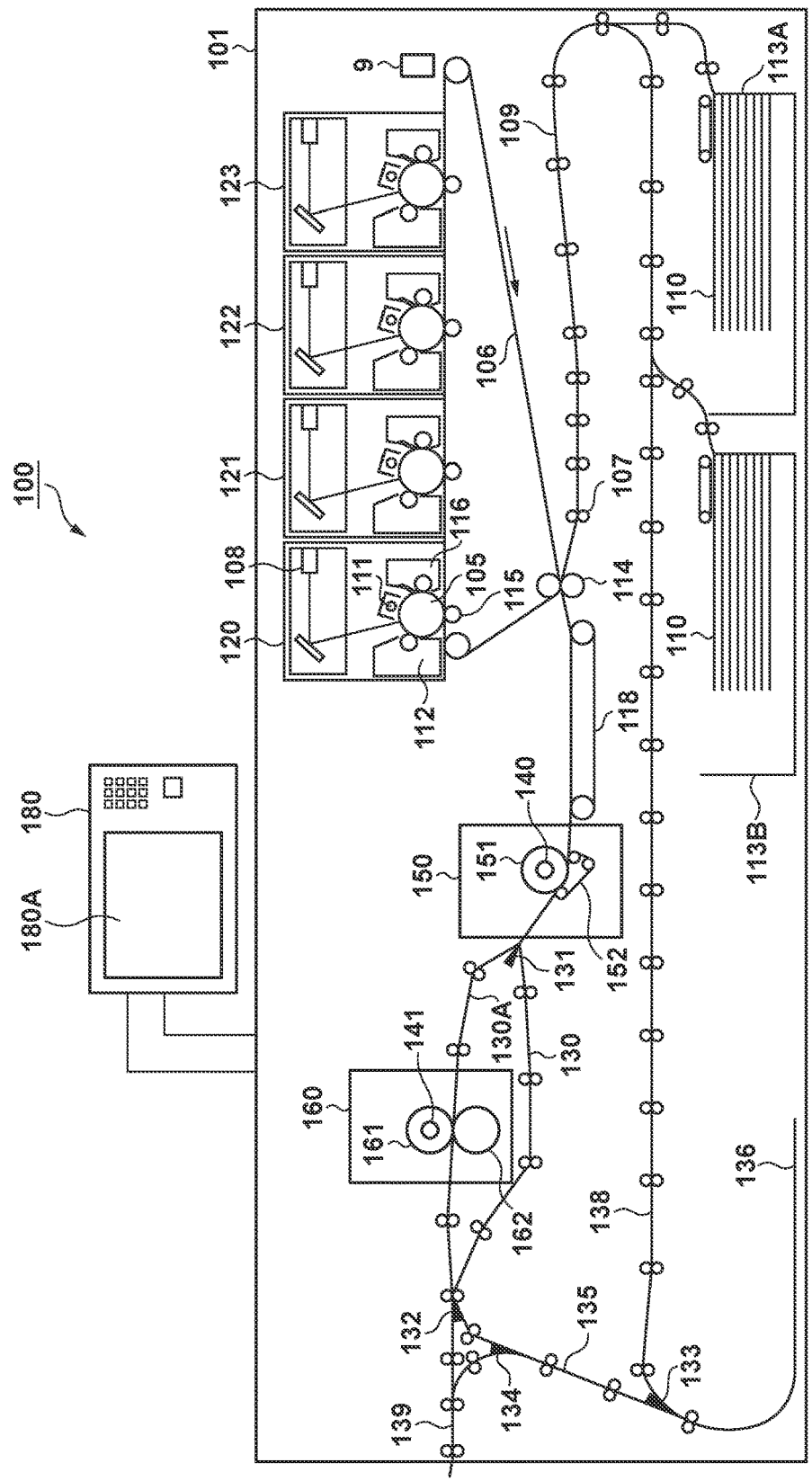
FIG. 1 is a configuration diagram of an image forming apparatus.

FIG. 1 is a schematic cross-sectional diagram of an image forming apparatus 100. The image forming apparatus 100 is a laser beam printer that forms full-color images on sheets 110. The image forming apparatus 100 includes a printer unit 101 and an operation panel 180. The operation panel 180 includes key buttons and a liquid crystal display 180A. The liquid crystal display 180A is a flat-panel display of a touchscreen type. The operation panel 180 is an interface via which a user inputs the number of printouts of images and a printing mode. Using the operation panel 180, the user can select a single-sided printing mode or a double-sided printing mode, execute a face-down discharge mode, and select a monochrome mode and a color mode.

The printer unit 101 includes four image forming units 120, 121, 122, and 123 that form images of their respective color components. The image forming unit 120 forms yellow images, the image forming unit 121 forms magenta images, the image forming unit 122 forms cyan images, and the image forming unit 123 forms black images.

As the image forming units 120 to 123 are configured in the same manner, a configuration of the image forming unit 120 that forms yellow images will be described below. A photosensitive drum 105 has a photosensitive layer on its surface. The photosensitive drum 105 functions as a photosensitive member. A charger 111 charges the photosensitive drum 105. Laser light of a laser scanner 108, which is controlled based on image data, scans the photosensitive drum 105, thereby forming an electrostatic latent image on the photosensitive drum 105. A developer 112 houses a developer containing toner and magnetic carrier. The developer 112 develops the electrostatic latent image on the photosensitive drum 105 using the developer. As a result, a toner image is formed on the photosensitive drum 105.

A primary transfer roller 115 forms a primary transfer nip portion by pressing the photosensitive drum 105 via an intermediate transfer belt 106. The toner image on the photosensitive drum 105 enters the primary transfer nip portion as the photosensitive drum 105 rotates. A non-illustrated power source unit applies a transfer voltage to the primary transfer roller 115. As a result, the toner image on the photosensitive drum 105 is transferred to the intermediate transfer belt 106 at the primary transfer nip portion. The intermediate transfer belt 106 functions as a transfer member (image carrier) to which the toner image is transferred. Toner images that have been formed by the image forming units 120 to 123 in their respective colors are transferred to the intermediate transfer belt 106 in such a manner that they overlap one another; as a result, a full-color toner image is carried on the intermediate transfer belt 106. Furthermore, the developer that has not been transferred from the photosensitive drum 105 to the intermediate transfer belt 106 at the primary transfer nip portion remains on the photosensitive drum 105. A drum cleaner 116 removes the developer remaining on the photosensitive drum 105 using a cleaning roller that comes into contact with the photosensitive drum 105.

An optical sensor 9 includes a light emitting element that emits light toward the intermediate transfer belt 106, and a light receiving element that receives reflected light from the intermediate transfer belt 106. The optical sensor 9 outputs a signal corresponding to an amount of reflected light from the toner image formed on the intermediate transfer belt 106.

A secondary transfer belt 114 forms a secondary transfer nip portion (transfer portion) by pressing a secondary transfer roller via the intermediate transfer belt 106. The toner image carried on the intermediate transfer belt 106 is conveyed to the secondary transfer nip portion as the intermediate transfer belt 106 rotates.

Cassettes 113A and 113B house the sheets 110. The sheets, which are fed one at a time by a feeding mechanism from the cassette 113A or the cassette 113B, are conveyed to the secondary transfer nip portion along a conveyance path 109. A conveyance roller 107 disposed on the conveyance path 109 conveys a sheet 110 toward the secondary transfer nip portion at the same timing as the toner image carried on the intermediate transfer belt 106.

A transfer voltage is applied to the secondary transfer belt 114. As a result, the secondary transfer belt 114 transfers the toner image (formed image) carried on the intermediate transfer belt 106 to the sheet 110. Note that the secondary transfer belt 114 functions as a transfer unit that transfers the toner image carried on the intermediate transfer belt 106 to the sheet 110.

The sheet 110 to which the toner image has been transferred is conveyed to fixing devices 150 and 160. The fixing devices 150 and 160 heat and pressurize the toner image transferred to the sheet 110, thereby fixing the toner image on the sheet 110. The fixing device 150 includes a fixing roller 151 provided with a heater 140 that heats the sheet 110, and a pressurizing belt 152 that causes the sheet 110 to come into contact with the fixing roller 151 with pressure. The fixing device 160 is disposed downstream in a conveyance direction of the sheet 110 relative to the fixing device 150. The fixing device 160 adds gloss (sheen) to the toner image on the sheet 110 that has passed through the fixing device 150. The fixing device 160 includes a fixing roller 161 provided with a heater 141 that heats the sheet, and a pressurizing roller 162 that causes the sheet 110 to come into contact with the fixing roller 161 with pressure.

When the image is to be fixed on the sheet 110 in a mode for adding gloss, and when the image is to be fixed on the sheet 110 that requires a large amount of heat in a fixing process, the sheet 110 that has passed through the fixing device 150 is conveyed to the fixing device 160 along a conveyance path 130A. On the other hand, when the image is to be fixed on thin paper, the sheet 110 that has passed through the fixing device 150 is conveyed along a conveyance path 130 that bypasses the fixing device 160. Note that an angle of a flapper 131 is controlled so as to control whether to convey the sheet 110 to the fixing device 160 or to convey the sheet 110 so that it bypasses the fixing device 160.

A flapper 132 is a guiding member that switches between guiding the sheet 110 to a conveyance path 135 and guiding the sheet to a conveyance path 139 going to the outside. The sheet 110 conveyed along the conveyance path 135 is conveyed to a reversing unit 136. When a reversing sensor (not illustrated) disposed on the conveyance path 135 detects the rear end of the sheet 110, the conveyance direction of the sheet 110 is reversed.

A flapper 133 is a guiding member that switches between guiding the sheet 110 to a conveyance path 138 for double-sided image formation and guiding the sheet to the conveyance path 135. When the face-down discharge mode has been executed, the sheet 110 is conveyed to the conveyance path 135 again and discharged from the image forming apparatus 100.

On the other hand, when the double-sided printing mode has been executed, the sheet 110 is conveyed to the secondary transfer nip portion again along the conveyance path 138. When the double-sided printing mode has been executed, the sheet 110 is switched back in the reversing unit 136 after an image is fixed on the first side of the sheet 110, conveyed to the secondary transfer nip portion along the conveyance path 138, and an image is formed on the second side of the sheet 110.

A flapper 134 is a guiding member that guides the sheet 110 to a conveyance path for discharge from the image forming apparatus 100. When the sheet 110 is to be discharged face down, the flapper 134 guides the sheet that has been switched back in the reversing unit 136 to the conveyance path for discharge. The sheet 110 that has been conveyed along the conveyance path for discharge is discharged to the outside of the image forming apparatus 100.

(Laser Scanner)

Figure 2A:
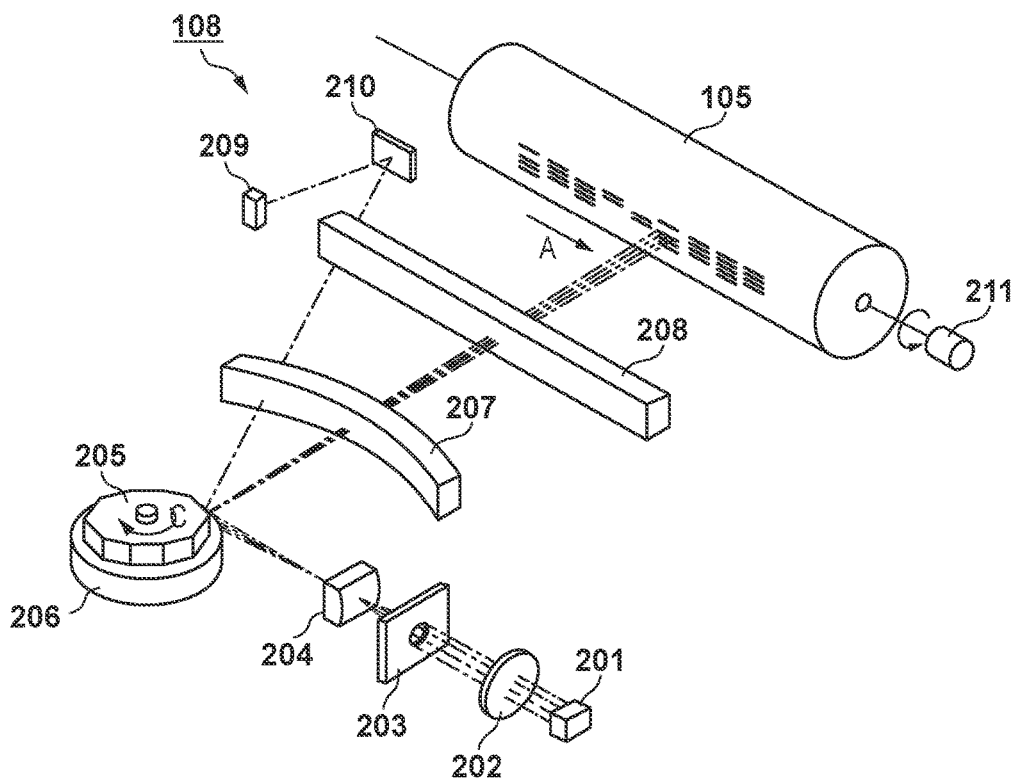
FIG. 2A is a configuration diagram of a laser scanner.

FIG. 2A is a schematic diagram of the laser scanner 108 and the photosensitive drum 105. The laser scanner 108 includes a semiconductor laser 201, which is a light source, a collimator lens 202, an aperture stop 203, a cylindrical lens 204, a polygon mirror 205, a motor 206, a toric lens 207, and a diffraction optical element 208.

The collimator lens 202 converts a light beam emanated from the semiconductor laser 201 into a collimated light beam. The aperture stop 203 restricts a light beam of laser light that passes therethrough. The cylindrical lens 204 forms an image of the light beam that has passed through the aperture stop 203 onto a reflective surface of the polygon mirror 205. The polygon mirror 205, which functions as a deflector (rotative multifaceted mirror), rotates in the direction of arrow C in the figure at an angular velocity of $\omega s$ with the aid of the motor 206, and deflects the laser light whose image has been formed on the reflective surface. The laser light deflected by the polygon mirror 205 scans the surface of the photosensitive drum 105 in the direction of A. The direction in which the laser light scans the photosensitive drum 105 will be referred to as a main scanning direction. On the other hand, a direction of a tangent to the surface of the photosensitive drum 105, which is a direction perpendicular to the main scanning direction, will be referred to as a sub scanning direction.

The toric lens 207 is an optical element with the $f\theta$ characteristics, and has different refractive indexes in the main scanning direction and the sub scanning direction. The front and back, or opposite, lens surfaces of the toric lens 207 in the main scanning direction are shaped as non-spherical surfaces. The diffraction optical element 208 is an optical element with the $f\theta$ characteristics, and has different scaling factors in the main scanning direction and the sub scanning direction. A beam detector 209 (hereinafter referred to as a BD 209) is disposed at a position that is equivalent to the outside of an image forming area of the photosensitive drum 105, and detects the laser light reflected by a reflective mirror 210. As a result, a scanning timing signal (BD signal) is generated. Then, in synchronization with the BD signal, the semiconductor laser 201 starts light emission that is equivalent to the next single scanning line in the main scanning direction.

Spots of the laser light that has been radiated from the semiconductor laser 201 and deflected by the polygon mirror 205, which is driven to rotate, linearly move on (scan) the photosensitive drum 105 in parallel to a photosensitive drum axis. The photosensitive drum 105 is driven by a drum motor 211 to rotate. The laser beam scans the photosensitive drum 105 while the photosensitive drum 105 is rotating, thereby forming an electrostatic latent image on the surface of the photosensitive drum 105.

(Polygon Sub Scanning Scaling)

A description is now given of polygon sub scanning scaling. Polygon sub scanning scaling is a process for changing an enlargement/reduction factor of an image formed on the photosensitive drum 105 by making variable the scanning speed (the rotation speed of the polygon mirror) when the laser scanner 108 exposes the photosensitive drum 105 to laser light.

Figure 2B:
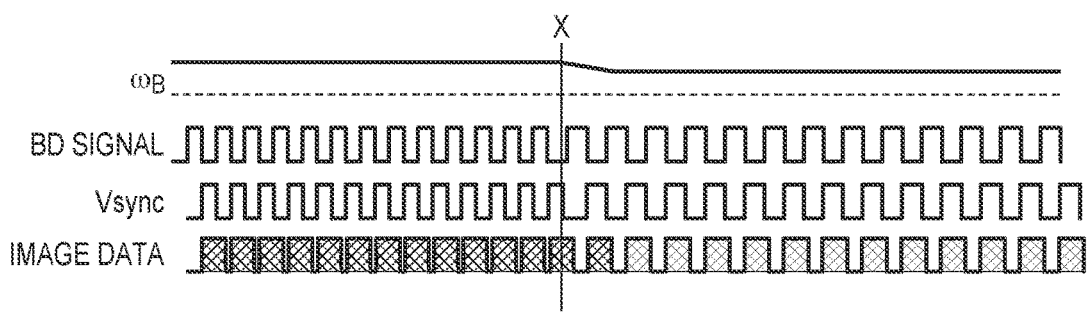
FIG. 2B is a diagram for describing the operation of the laser scanner.

FIG. 2B shows a timing chart of scanning by laser light. In synchronization with a BD signal output from the BD 209, a vertical synchronization signal Vsync is generated. In synchronization with the vertical synchronization signal Vsync, the semiconductor laser 201 emits laser light corresponding to image data per scanning line. As the angular velocity ws of the polygon mirror 205 decreases at timing X, an output cycle (an output interval) of the BD signal increases. In a case where the surface speed (the circumferential speed) of the photosensitive drum 105 is constant, the interval between scanning lines increases as the output cycle (the output interval) of the BD signal increases. As a result, the scaling factor of the image in the sub scanning direction (the sub scanning scaling factor) increases. That is to say, the interval between scanning lines is adjusted based on the scaling factor. Note that in order to reduce the image in the sub scanning direction, it is sufficient to increase the angular velocity ws of the polygon mirror 205.

In polygon sub scanning scaling, the sub scanning scaling factor of the image is changed by changing the rotation speed (the angular velocity ws) of the polygon mirror 205. The angular velocity ws of the polygon mirror 205 is controlled based on the rotation speed of the motor 206. The motor 206 undergoes feedback control so that the rotation speed of the motor 206 matches a target rotation speed. Therefore, polygon sub scanning scaling is realized as a motor driver 25 (FIG. 4) makes variable a target value of the rotation speed of the motor 206. Note that if the angular velocity ws of the polygon mirror 205 is changed, geometric characteristics of the image will be changed. For this reason, the image forming apparatus 100 generally executes color registration adjustment control immediately after the angular velocity ws of the polygon mirror 205 is changed. In this way, the image forming apparatus 100 suppresses image misregistration in the sub scanning direction that has occurred due to the change in the angular velocity of the polygon mirror 205.

(Color Registration Adjustment Control)

A description is now given of relative positional misregistration (color misregistration) that can occur between toner images of different colors transferred to the intermediate transfer belt 106 by the image forming units 120 to 123. If relative positional misregistration occurs in images of different color components transferred onto the intermediate transfer belt 106, the shades of colors of images formed on the sheets 110 will change. The inventors refer to the difference in the image forming positions of images of different color components as color misregistration. The image forming apparatus 100 forms pattern images for detecting color misregistration on the intermediate transfer belt 106, and corrects the image forming positions of images of different color components based on the result of detection of the pattern images by the optical sensor 9. The foregoing sequence of correction processes is the color registration adjustment control. The image forming apparatus 100 executes the color registration adjustment control after the power is turned ON, after images corresponding to a predetermined number of pages are formed, or after the angular velocity of the polygon mirror 205 is changed.

(Secondary Transfer Unit)

Figure 3:
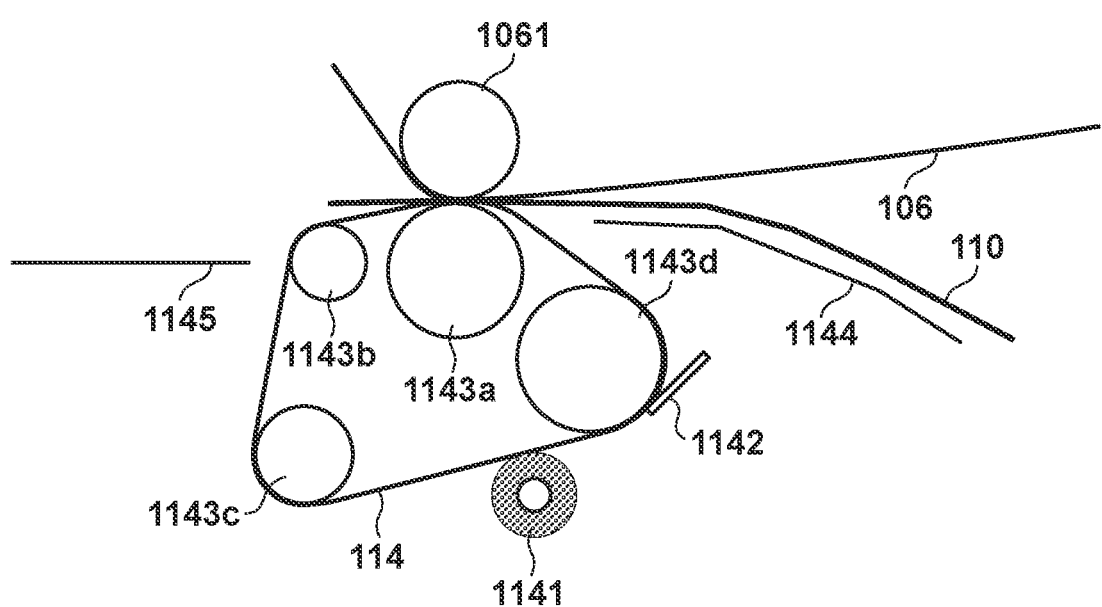
FIG. 3 is an enlarged view of main parts of a secondary transfer nip portion.

FIG. 3 is an enlarged view of main parts of the secondary transfer nip portion. A secondary transfer roller 1061 is inscribed in the intermediate transfer belt 106. A secondary transfer outer roller 1143a and tension rollers 1143b, 1143c, and 1143d are inscribed in the secondary transfer belt 114. The secondary transfer outer roller 1143a is electrically grounded. When a toner image on the intermediate transfer belt 106 is to be transferred to a sheet 110, the secondary transfer belt 114 holds the sheet 110 between itself and the intermediate transfer belt 106, and transfers the toner image on the intermediate transfer belt 106 to the sheet 110 using an electrostatic force. A brush 1141 and a cleaning blade 1142 are provided on an outer circumference of the secondary transfer belt 114. The brush 1141 and the cleaning blade 1142 are cleaning mechanisms for collecting the toner image formed on the intermediate transfer belt 106 when the toner image has been transferred directly to the secondary transfer belt 114.

The intermediate transfer belt 106 and the secondary transfer belt 114 can be driven at discrete speeds. The intermediate transfer belt 106 rotates as the secondary transfer roller 1061 rotates. A motor 1062 (FIG. 4) drives and rotates the secondary transfer roller 1061 so that the surface speed (circumferential speed) of the intermediate transfer belt 106 matches a predetermined surface speed (circumferential speed) V1. The secondary transfer belt 114 rotates as the secondary transfer outer roller 1143a rotates. A motor 1147 (FIG. 4) drives and rotates the secondary transfer outer roller 1143a so that the surface speed (circumferential speed) of the secondary transfer belt 114 matches a predetermined surface speed (circumferential speed) V2. The secondary transfer belt 114 is a conveyance member that conveys the sheet 110 to a secondary transfer unit. That is to say, the conveyance speed of the sheet 110 is equal to the surface speed V2 of the secondary transfer belt 114.

The sheet 110 conveyed via the conveyance path 109 is guided to the secondary transfer nip portion by a guide 1144. The sheet 110 that has passed through the secondary transfer nip portion is discharged onto a guide 1145. The guide 1145 guides the sheet 110 to a conveyance belt 118.

(Adjusting Speed of Secondary Transfer Belt)

FIGS. 5A to 5C are schematic diagrams of setting screens that are displayed on the liquid crystal display 180A of the operation panel 180. FIG. 5D is a table showing fixing temperatures and circumferential speed differences in correspondence with basis weights of the sheets 110. This table is stored in, for example, a ROM 11. The setting screens, which are displayed on the liquid crystal display 180A by a CPU 10, include various types of operation buttons (key buttons). The user sets for the sheets 110, for example, a printing condition, by operating the operation buttons.

A condition of a print job and a sheet attribute of the sheets 110 are stored in a RAM 12. The user can set the sheet attribute as shown in FIGS. 5A and 5C, and can set the condition of the print job as shown in FIG. 5B. The sheet attribute is sheet-related information, such as the basis weight of the sheets 110, the type and size of the sheets 110, and an enlargement/reduction factor of an image in the conveyance direction of the sheets 110.

Using the setting screen of FIG. 5A, the user can set the basis weight of the sheets 110 by operating a "−" key 1801 and a "+" key 1802. The user changes the basis weight, which is the sheet attribute, by operating an "OK" key 1804. To cancel changing of the basis weight, the user operates a "cancel" key 1803.

Using the setting screen of FIG. 5B, the user can set an operation mode for optimizing the print job. In the present embodiment, several patterns of operation modes can be selected in accordance with the basis weight of the sheets 110 set in FIG. 5B. Here, an image quality priority mode that prioritizes image quality, and a productivity priority mode that prioritizes productivity rather than image quality, can be selected as an operation mode.

In a print job in which thin sheets of paper and thick sheets of paper are loaded in a mixed manner, the fixing temperature is switched so that optimal gloss is achieved on each sheet in the case of the image quality priority mode. Therefore, there is downtime until the fixing temperature reaches a predetermined temperature. In the case of the productivity priority mode, as a print job is executed at a common fixing temperature, there is no downtime caused by switching of the fixing temperature. However, the image quality of an image formed in the productivity priority mode does not exhibit optimal gloss. The user can select the productivity priority mode and the image quality priority mode using a productivity priority button 1805 and an image quality priority button 1806, respectively, on the setting screen of FIG. 5B. To reflect the selection result, the user operates an "OK" key 1808. To cancel the selection, the user operates a "cancel" key 1807.

The table of FIG. 5D shows, for each of the image quality priority mode and the productivity priority mode, the fixing temperatures and the speed differences between the circumferential speeds (hereinafter referred to as the circumferential speed differences) using a basis weight of 150 [gsm] as a borderline. Here, the basis weight is the weight of a sheet per square meter. The circumferential speed difference is expressed as an amount obtained by offsetting (the circumferential speed V1 of the intermediate transfer belt 106)/(the circumferential speed V2 of the secondary transfer belt 114) from 100 [%]. For example, a circumferential speed difference of 1.50 [%] means that the circumferential speed V1 of the intermediate transfer belt 106 is higher by 1.50 [%] than the circumferential speed V2 of the secondary transfer belt 114.

The image forming apparatus 100 according to the present embodiment switches the fixing temperature and changes the circumferential speed difference using a basis weight of 150 [gsm] of the sheets 110 as a benchmark, and therefore can achieve the optimal image quality while maintaining productivity even when the sheets 110 of different basis weights are loaded in a mixed manner. In the image quality priority mode, image formation of high image quality is achieved by changing the fixing temperature and the circumferential speed difference in accordance with a basis weight. In the productivity priority mode, the same fixing temperature and the same circumferential speed difference are used regardless of a basis weight. As such, the circumferential speed difference can be set based on the image quality setting, that is to say, whether the image quality priority mode is currently selected, and on the basis weight of the sheets.

Furthermore, using the setting screen of FIG. 5C, the user can set an adjustment amount of the circumferential speed V2 of the secondary transfer belt 114. The user can freely change the circumferential speed V2 of the secondary transfer belt 114 by selecting a positive/negative sign of an adjustment value using a "±" key 1811 and operating a "−" key 1812 and a "+" key 1813. To change the circumferential speed V2 of the secondary transfer belt 114, which is the sheet attribute, the user operates an "OK" key 1815. To cancel changing, the user operates a "cancel" key 1814.

In an example of FIG. 5C, the adjustment amount of the speed of the secondary transfer belt 114 is set between "−3 and 3", and the circumferential speed difference determined by the table of FIG. 5D is offset by 0.05 [%] per level. For example, referring to the table, in the image quality priority mode, the circumferential speed difference for a sheet of thick plain paper with a basis weight of 160 [gsm] is 1.50 [%]. When "+3" has been set on the setting screen of FIG. 5C to improve "graininess" of an image, a circumferential speed difference of 1.65 [%], which is obtained by offsetting a circumferential speed difference of 1.50 [%] by 0.15 [%], is set.

The image forming apparatus 100 offsets a change in the image scaling factor whereby an image transferred to a sheet 110 in the secondary transfer unit is enlarged/reduced in the sub scanning direction (conveyance direction) by applying sub scanning scaling to the image (digital scaling in the conveyance direction in which the sheet 110 is conveyed). In this way, an image that is neither enlarged nor reduced can be obtained regardless of whether there is a circumferential speed difference between the circumferential speed of the intermediate transfer belt 106 and the circumferential speed of the secondary transfer belt 114. Sub scanning scaling includes digital sub scanning scaling based on correction of image data indicating an image, and polygon sub scanning scaling based on control of laser light when forming an image on the photosensitive drum 105. Note that conversion from the circumferential speed difference into the adjustment amount of the sub scanning scaling factor can be carried out by conversion using, for example, a predetermined computation formula, table, etc.

(Functional Block Diagram)

Figure 4:
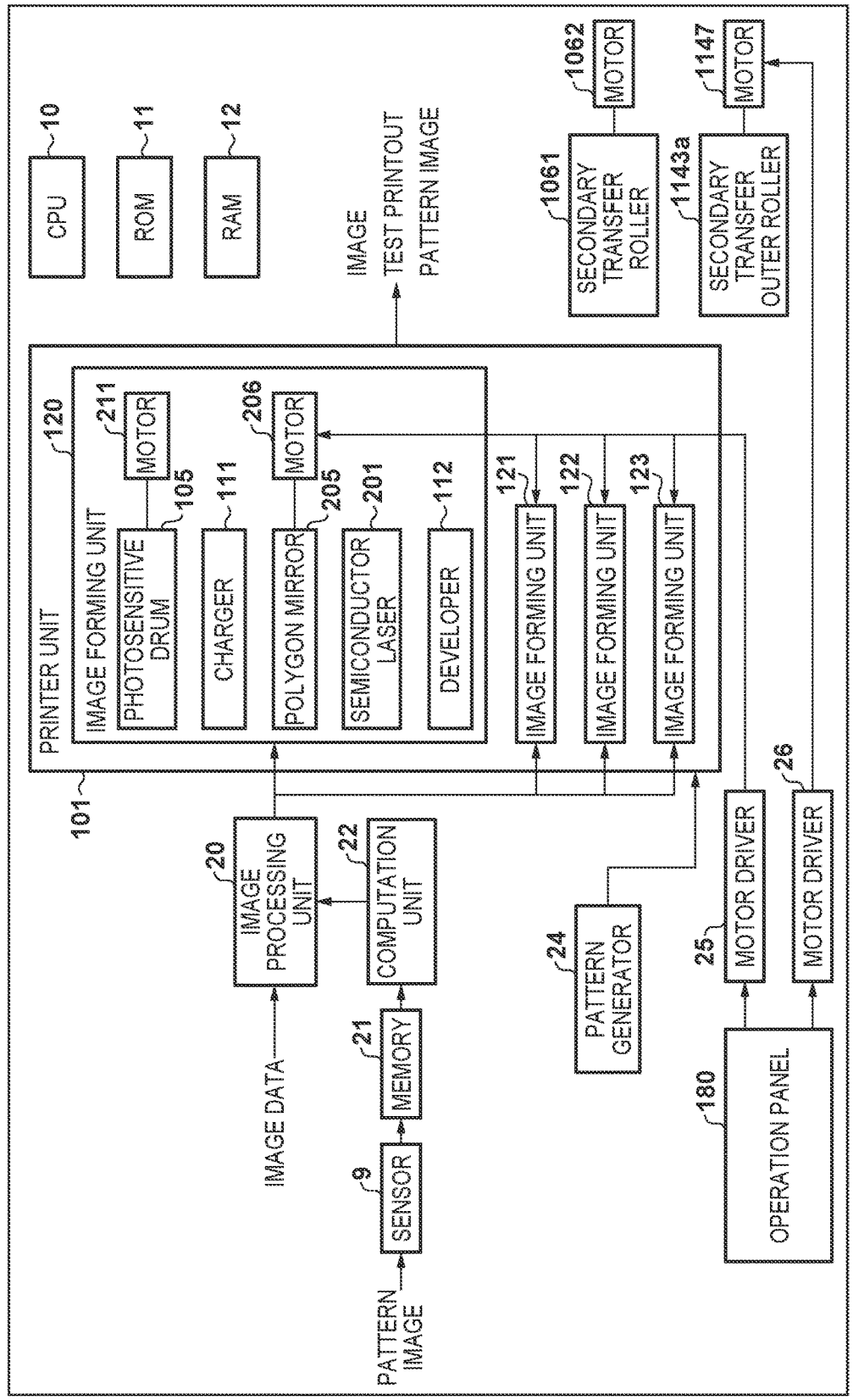
FIG. 4 is a control block diagram of the image forming apparatus.

FIG. 4 is a control block diagram of the image forming apparatus 100. The image forming apparatus 100 includes the CPU 10, the ROM 11, the RAM 12, and the sensor 9. An image processing unit 20 applies image processing to image data.

The motor 211 rotates so that the photosensitive drum 105 achieves a predetermined rotation speed. The motor 206 rotates the polygon mirror 205. A motor driver 25 controls the motor 206 so that the rotation speed of the polygon mirror 205 matches a target speed. The target rotation speed of the polygon mirror 205 is adjusted based on a scaling factor in the sub scanning direction. Note that the CPU 10 sets the target speed of the polygon mirror 205 based on information of the length of a test printout that has been input by the user using the operation panel 180. The motor 1062 rotates the secondary transfer roller 1061 so that the rotation speed of the intermediate transfer belt 106 matches a target speed. The motor 1147 rotates the secondary transfer outer roller 1143a. A motor driver 26 controls the motor 1147 so that the rotation speed of the secondary transfer belt 114 matches a target speed. Note that the CPU 10 sets the target speed of the secondary transfer belt 114 based on information related to the speed of the secondary transfer belt 114 that has been input by the user using the operation panel 180.

A pattern generator 24 transfers, to the printer unit 101, pattern image data for causing the printer unit 101 to form pattern images that are used to detect color misregistration. The pattern generator 24 also transfers, to the printer unit 101, test image data for causing the printer unit 101 to form a test printout that is used to adjust the target rotation speed of the polygon mirror 205.

The optical sensor 9 includes the light emitting element that radiates light toward the intermediate transfer belt 106 or the pattern images, and the light receiving element that receives reflected light from the intermediate transfer belt 106 or the pattern images. The light receiving element receives diffused reflection light of light radiated from the light emitting element toward the intermediate transfer belt 106. Upon receiving light reflected by the intermediate transfer belt 106 or light reflected by the pattern images formed on this intermediate transfer belt 106, the light receiving element outputs a signal of a level corresponding to an amount of received light.

A memory 21 stores a signal value output from the optical sensor 9. A computation unit 22 computes the amounts of color registration adjustment based on the result of detection of the pattern images stored in the memory 21. Based on the amounts of color registration adjustment computed by the computation unit 22, the image processing unit 20 applies image processing to image data in order to correct an image forming position on a per-color basis. As a result, the relative positions of yellow, cyan, and black images and a magenta image are corrected. In the present example, a position of a magenta image represents a reference position. Note that magenta will be referred to as a reference color. A method of computing the amounts of color registration adjustment will be described later using FIGS. 7A and 7B.

(Color Registration Adjustment)

A description is now given of relative misregistration (color misregistration) that occurs between toner images of different colors that are transferred to the intermediate transfer belt 106 by different image forming units, and a method of correcting the same. As stated earlier, yellow, magenta, cyan, and black toner images are respectively formed on the photosensitive drums 105. The toner images formed on different photosensitive drums are transferred to a sheet; as a result, a color image is formed on the sheet. At this time, if misregistration occurs in the way the toner images formed on different photosensitive drums overlap, image quality will be lowered because the shades of colors of an original image become different from the shades of colors of an output image.

In view of this, the image forming apparatus 100 forms pattern images on the intermediate transfer belt 109. Then, based on the result of detection of the pattern images used as images for measurement (the amounts of color misregistration), the relative positions of toner images of different colors are corrected. Note that the image forming apparatus 100 executes color registration adjustment control when, for example, the power of the image forming apparatus 100 is turned ON. Also, the image forming apparatus 100 executes color registration adjustment control when, for example, a predetermined period has elapsed since the power of the image forming apparatus 100 was turned ON. Furthermore, the image forming apparatus 100 executes color registration adjustment control when, for example, the number of sheets on which images have been formed has reached a predetermined number.

Figure 6:
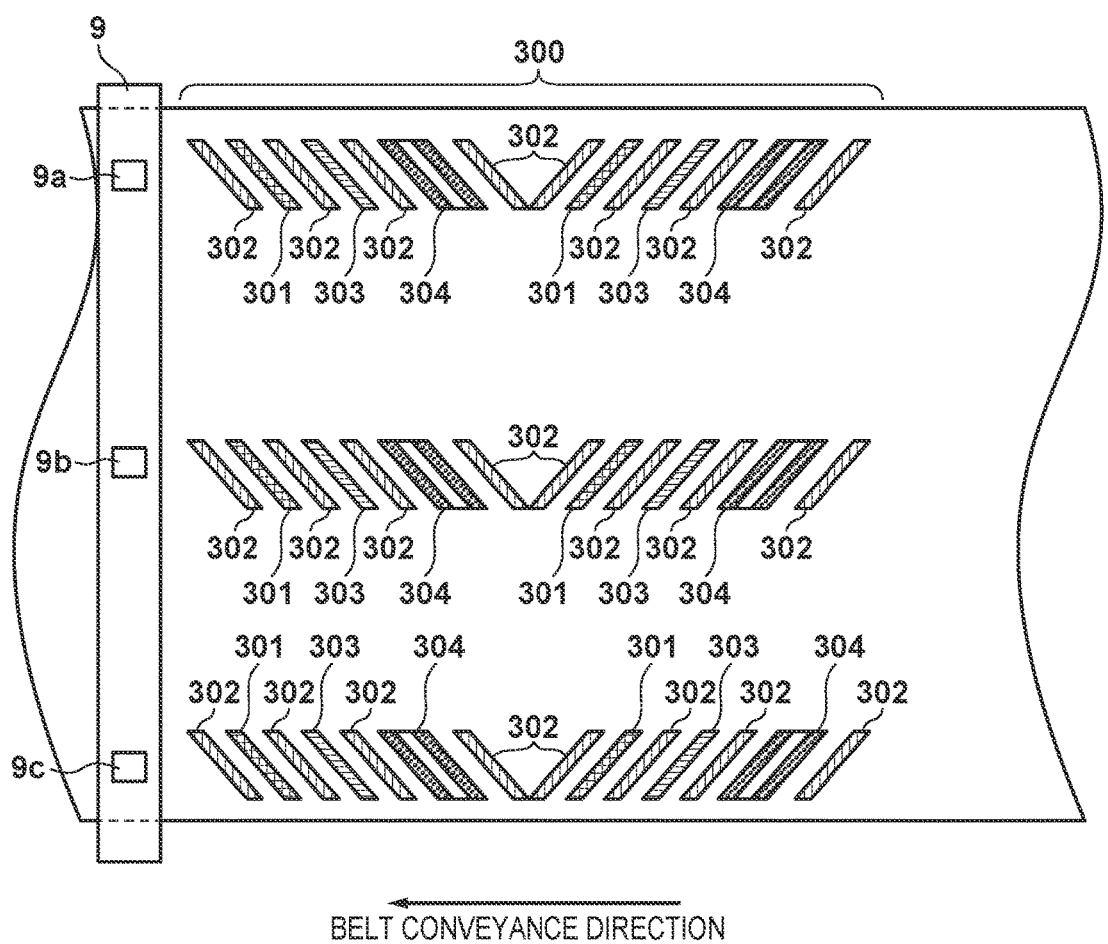
FIG. 6 is a diagram showing pattern images for color registration adjustment.

Upon issuance of an instruction for starting color registration adjustment control, driving of the intermediate transfer belt 106 is started, and the printer unit 101 starts forming a plurality of pattern images 300 shown in FIG. 6. Note that the plurality of pattern images 300 are formed continuously, in a plurality of sets, on the intermediate transfer belt 106. The pattern images 300 include magenta pattern images 302, yellow pattern images 301, cyan pattern images 303, and black pattern images 304. Furthermore, the optical sensor 9 receives diffused reflection light from the pattern images, and outputs a signal value corresponding to an amount of received light. The signal value from the optical sensor 9 is input to a comparator (not shown). The comparator (not shown) compares the signal value from the optical sensor 9 with a threshold, and outputs a binary signal based on the comparison result.

Figure 7A:
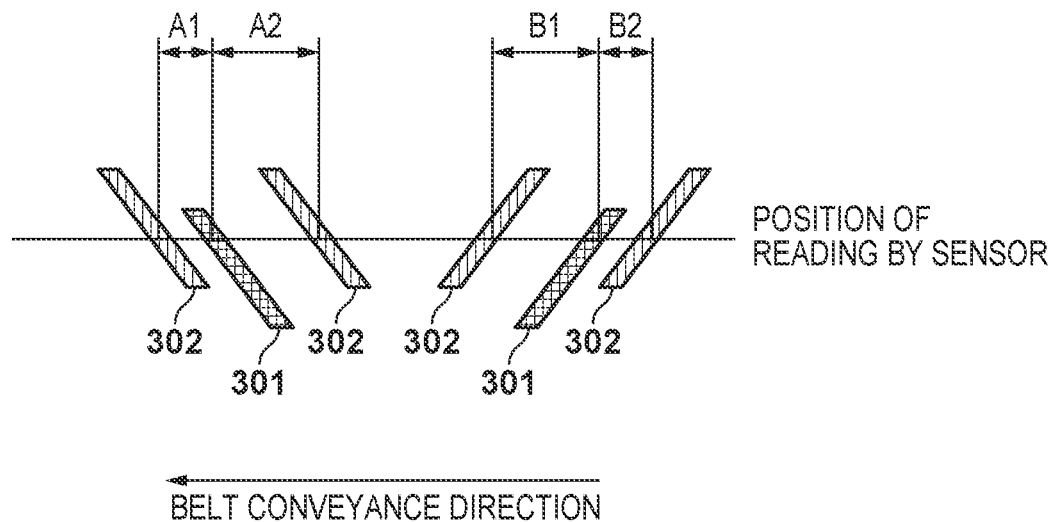
FIGS. 7A and 7B are diagrams for describing a method of calculating an amount of color misregistration.
Figure 7B:
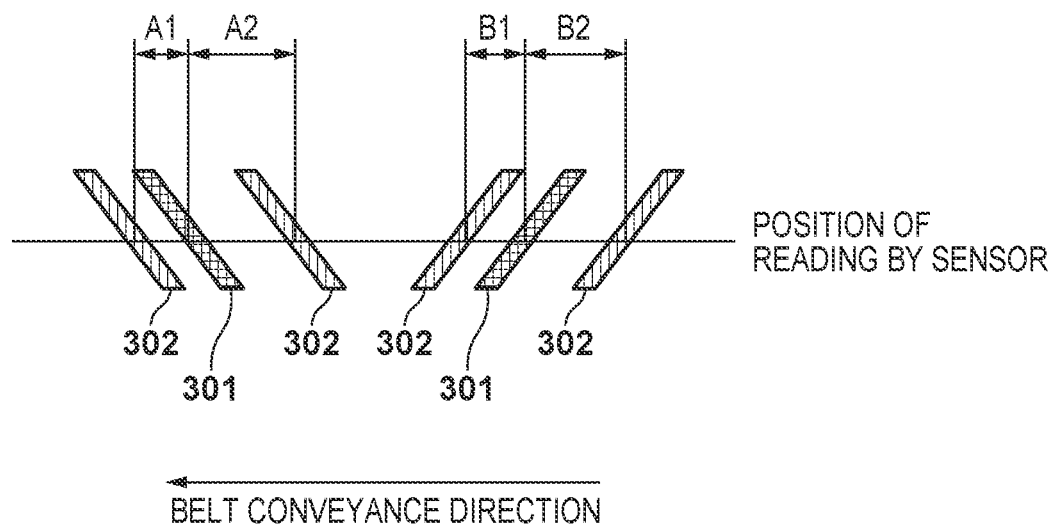

A description is now given of a method of detecting an amount of color misregistration. In the present embodiment, the reference color is magenta. FIGS. 7A and 7B are schematic diagrams for describing a method of calculating an amount of color misregistration between (the difference between relative positions of) the pattern images 301 and the pattern images 302. FIG. 7A shows a case in which the pattern images 301 are misregistered in the direction (main scanning direction) perpendicular to the conveyance direction relative to the pattern images 302. Here, each pattern image 301 is formed in such a manner that it is interposed between two pattern images 302. Therefore, the distances between their centers of mass are defined as A1, A2, B1, and B2 as shown in FIG. 7A. When there is no misregistration in the positional relationship, A1=A2=B1=B2. In the state of FIG. 7A, the following formula is used in calculation, provided that an amount of misregistration of the yellow pattern images 301 in the main scanning direction is ΔH.

$$\Delta H = \{(B2-B1)/2 - (A2-A1)/2\}/2 \quad (1)$$

Likewise, FIG. 7B shows a state where the yellow pattern images 301 are misregistered in the sub scanning direction, and the following formula is similarly used in calculation, provided that an amount of misregistration in the sub scanning direction is ΔV $$\Delta V = \{(B2-B1)/2 + (A2-A1)/2\}/2 \quad (2)$$

Although color misregistration can occur in the main scanning direction and in the sub scanning direction simultaneously in practice, each of the aforementioned formulae holds independently.

In the present embodiment, the plurality of pattern images 300 are formed continuously, and for each color to be corrected relative to the reference color (magenta), the amounts of misregistration obtained by detecting each pattern image are averaged. Then, based on average values of the amounts of misregistration obtained from each pattern image, an image forming condition related to the forming positions of toner images is corrected. Using FIG. 8, a description is now given of the reason why color registration adjustment is executed based on average values of the amounts of misregistration obtained from each pattern image 300 in the plurality of pattern images 300.

As stated earlier, the rotation of the intermediate transfer belt 106 is dependent on the rotation of the secondary transfer roller 1061. Here, assume a case where the circumferential speed of the intermediate transfer belt 106 fluctuates in a rotation cycle of the secondary transfer roller 1061 due to, for example, eccentricity of the secondary transfer roller 1061. If the circumferential speed of the intermediate transfer belt 106 changes, a time interval at which two neighboring toner images shown in FIGS. 7A and 7B are detected will change, and thus detected values of the distances A1, A2, B1, B2, and so on will also change accordingly. That is to say, detected amounts of misregistration change depending on the circumferential speed of the intermediate transfer belt 106 at the time of detection of the pattern images. Therefore, as shown in FIG. 8, the plurality of pattern images are formed at an equal interval at distances corresponding to integral multiples of the speed fluctuation cycle of the intermediate transfer belt 106. In FIG. 8, a total of ten sets of pattern images 300, namely #1 to #10 are formed at an equal interval at distances corresponding to nine cycles of the speed fluctuation of the intermediate transfer belt 106. As indicated by a dash line in FIG. 8, the amounts of color misregistration obtained from the pattern images 300 include error caused by the speed fluctuation of the intermediate transfer belt 106. Error caused by the speed fluctuation of the intermediate transfer belt 106 changes cyclically. For this reason, the image forming apparatus 100 according to the present embodiment determines the amounts of color misregistration with which the influence of the fluctuation of the circumferential speed of the intermediate transfer belt 106 has been suppressed, by obtaining average values of the amounts of color misregistration that have been detected from the pattern image group 300 (#1 to #10) formed at a predetermined interval.

Figure 9A:
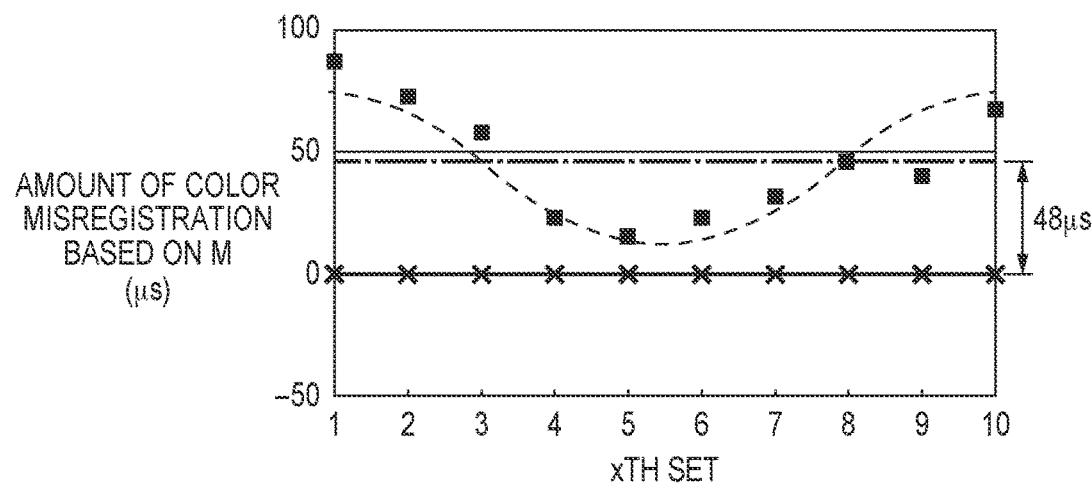
FIGS. 9A and 9B are diagrams showing the result of calculating the amounts of color misregistration.

FIG. 9A shows detected values of the amounts of color misregistration of a certain color to be corrected in a case where ten sets of pattern images 300 have been formed at an equal interval at distances corresponding to nine cycles of the speed fluctuation of the intermediate transfer belt 106 as shown in FIG. 8. As shown in FIG. 9A, the amounts of color misregistration detected from the pattern images 300 change in the shape of a substantial sine wave. As shown in FIG. 9A, an average amount of color misregistration detected is 48 microseconds when converted into time.

(Image Forming Operation)

Figure 10:
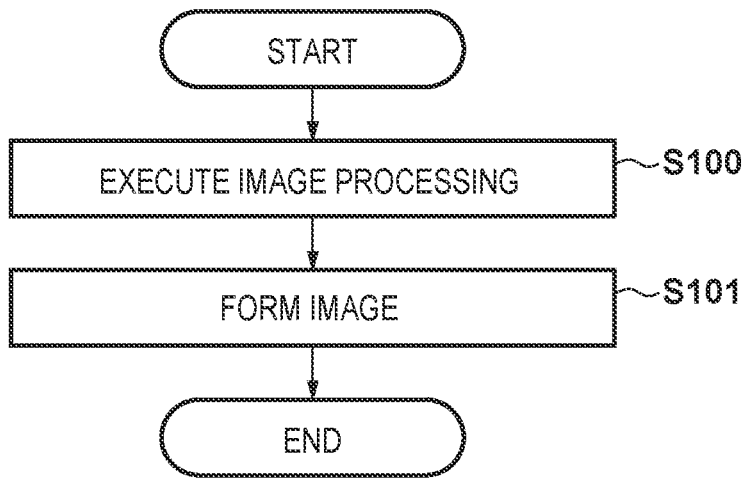
FIG. 10 is a flowchart of an image forming operation.

Based on a flowchart of FIG. 10, the following describes an image forming operation in which the image forming apparatus 100 forms an image based on image data. Note that once the image data has been transferred to the image forming apparatus 100, the CPU 10 reads out a program stored in the ROM 11, and executes each process of the flowchart of FIG. 10.

The CPU 10 inputs the image data to the image processing unit 20, and the image processing unit 20 applies image processing to the image data (step S100). Based on the amounts of color registration adjustment computed by the computation unit 22, the image processing unit 20 applies image processing to the image data so that the amounts of main scanning misregistration and the amounts of sub scanning misregistration will be corrected. Then, the CPU 10 forms an image on a sheet based on the image data output from the image processing unit 20 by controlling the printer unit 101 (step S101), and ends image formation corresponding to one page. As the image forming operation of the printer unit 101 in step S101 has already been described, a description thereof will be omitted here. The CPU 10 repeatedly executes the image forming operation until all images contained in the image data are formed on sheets.

Figure 11:
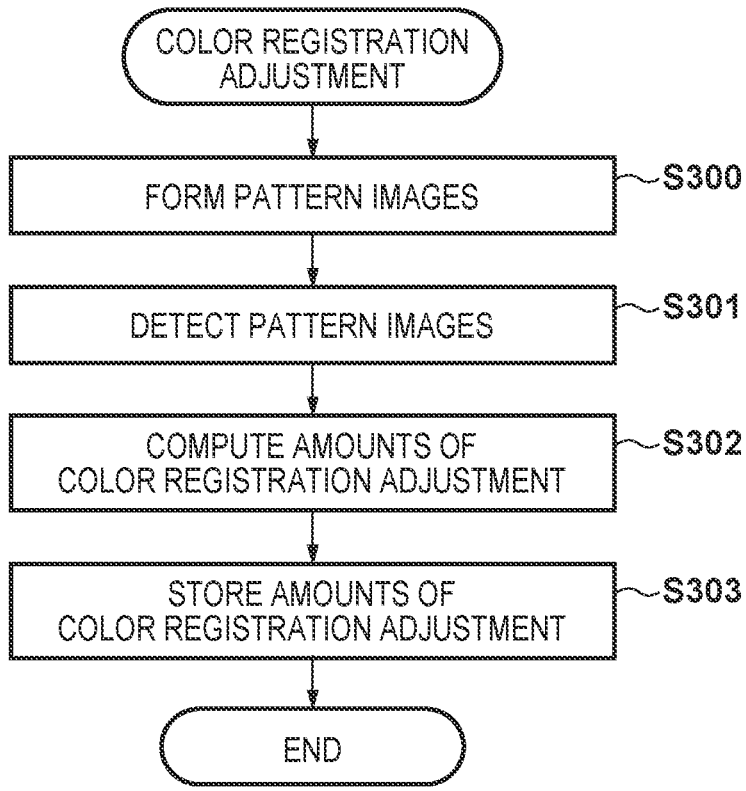
FIG. 11 is a flowchart of color registration adjustment control.

FIG. 11 is a flowchart diagram of color registration adjustment control using the pattern images 300. When the user has issued an instruction for executing color registration adjustment on the operation panel 180, the CPU 10 reads out a program stored in the ROM 11, and executes each process of a flowchart of FIG. 11. Furthermore, when the image forming apparatus 100 has printed images on a predetermined number of sheets, the CPU 10 reads out a program stored in the ROM 11, and executes each process of the flowchart of FIG. 11. At this time, the CPU 10 may be configured to suspend the image forming operation and execute each process of the color registration adjustment control shown in FIG. 11. In the case of this configuration, the CPU 10 resumes the image forming operation after the color registration adjustment control is executed. Furthermore, the CPU 10 may be configured to execute each process of the color registration adjustment control shown in FIG. 11 when the difference between the temperature that was obtained by a non-illustrated sensor provided in the image forming apparatus 100 during the previous execution of the color registration adjustment control and the current temperature is larger than a predetermined value.

First, the CPU 10 forms ten sets of pattern images 300 on the intermediate transfer belt 106 by controlling the printer unit 101 (step S300). In step S300, the CPU 10 causes the pattern generator 24 to output pattern image data. As a result, the image forming units 120 to 123 form the plurality of pattern images 300 on the intermediate transfer belt 106. The CPU 110 adjusts the interval between the plurality of pattern images 300 to be formed in accordance with the target rotation speed of the polygon mirror 205. The CPU 110 determines the interval between the plurality of pattern images 300 based on a scaling factor. Here, the interval between the plurality of pattern images 300 is the length which extends between a certain pattern image 300 and a pattern image 300 to be formed next to the certain pattern image 300 on the intermediate transfer belt 106, and over which no pattern image is formed, in the sub scanning direction. It is permissible to adopt a configuration in which the interval between the pattern images 300 is adjusted based on a scaling factor of sub scanning scaling for images, that is to say, information related to an enlargement/reduction factor. Note that the reason why the interval between the pattern images 300 to be formed is adjusted in accordance with the target rotation speed of the polygon mirror 205 will be described later.

The CPU 10 detects the pattern images 300 on the intermediate transfer belt 106 by controlling the optical sensor 9 (step S301). The result of detection of the pattern images 300 by the optical sensor 9 is stored to the memory 21. Then, the CPU 10 computes the amounts of color registration adjustment by controlling the computation unit 22 (step S302). Note that as a method of computing the amounts of color registration adjustment has already been described, a description thereof will be omitted here. The CPU 10 stores the amounts of color registration adjustment calculated in step S302 to a nonvolatile memory (step S303), and ends processing of the color registration adjustment control.

(Scaling Factor Adjustment Control)

Figure 12A:
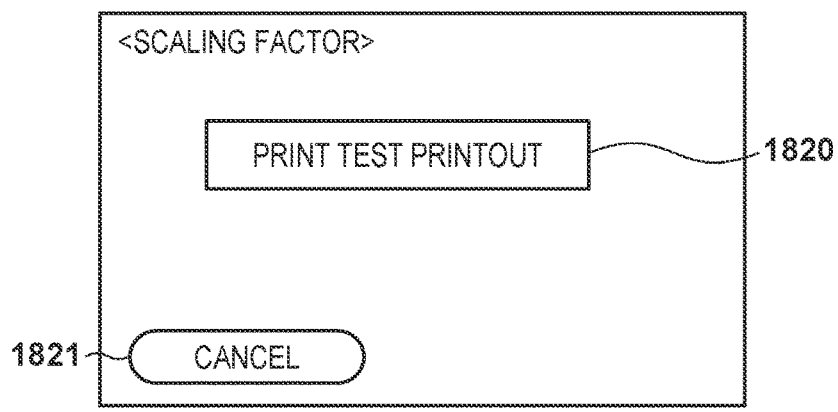
FIGS. 12A to 12C are diagrams showing setting screens.
Figure 12B:
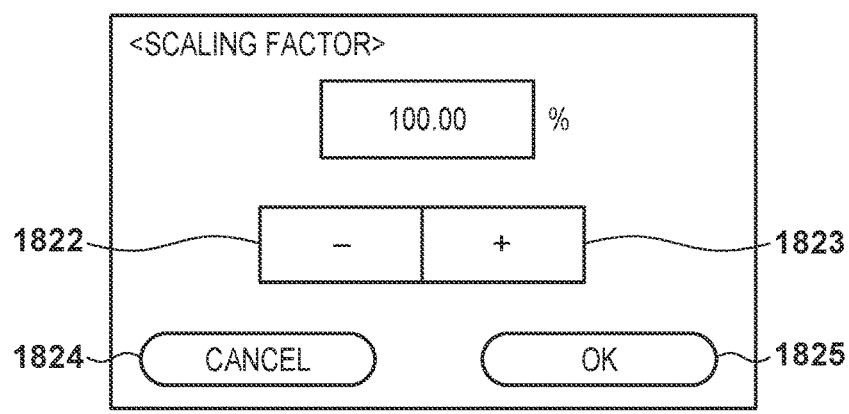
Figure 12C:
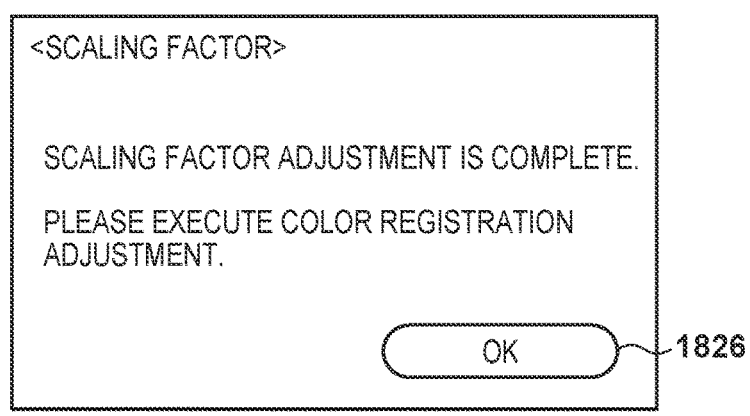

Based on FIGS. 12A to 12C, 13, and 14, the following describes scaling factor adjustment control in which the image forming apparatus 100 adjusts the target rotation speed of the polygon mirror 205. FIGS. 12A to 12C are diagrams exemplarily showing setting screens that are displayed on the display unit 180A of the operation panel 180 in order to set the target rotation speed of the polygon mirror 205. The setting screens displayed on the display unit 180A by the CPU 10 include various types of operation buttons (key buttons). The user sets the target rotation speed of the polygon mirror by operating the operation buttons.

On the setting screen of FIG. 12A, the user can instruct the image forming apparatus 100 to print a test printout. In order to issue an instruction for printing the test printout, the user operates a key button 1820. Note that in order not to execute the scaling factor adjustment control, the user operates a "cancel" key 1821. When the key button 1820 of FIG. 12A has been operated, the image forming apparatus 100 prints a test printout shown in FIG. 13. The user determines a scaling factor of an image in the conveyance direction so that a length Lp of a printing area of the test printout matches a predetermined length. The predetermined length is determined by the user as appropriate.

On the setting screen of FIG. 12B, the user operates a "−" key 1822 and a "+" key 1823. As a result, the sub scanning scaling factor of the image is changed. That is to say, the length Lp of the printing area can be adjusted by changing the sub scanning scaling factor of the image. The user changes the sub scanning scaling factor of the image by operating an "OK" key 1825. To cancel changing of the sub scanning scaling factor, the user operates a "cancel" key 1824.

When the user has pressed an "OK" key 1825, the CPU 10 determines the target rotation speed of the polygon mirror 205 based on the sub scanning scaling factor. Then, the screen on the display unit 180A makes a transition to the screen of FIG. 12C. The screen of FIG. 12C displays a message for notifying the user of the fact that the target rotation speed of the polygon mirror 205 has been set. Furthermore, the screen of FIG. 12C displays a message that suggests the user to execute the color registration adjustment control. Then, when the user has operated an "OK" key 1826 on the screen of FIG. 12C, processing of the scaling factor adjustment control ends. Note that as a method of determining the target rotation speed of the polygon mirror 205 based on information related to the scaling factor of the image is a known technique, a description thereof will be omitted here.

Figure 13:
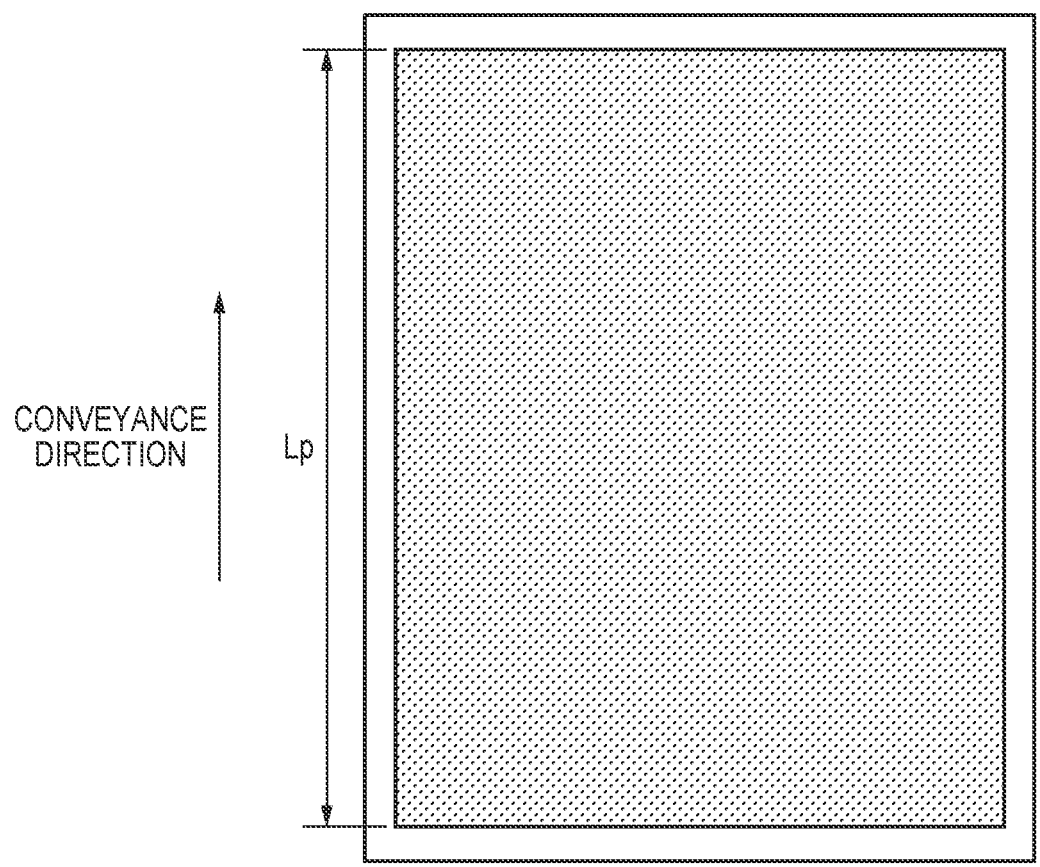
FIG. 13 is a diagram showing an image formed on a test printout.
Figure 14:
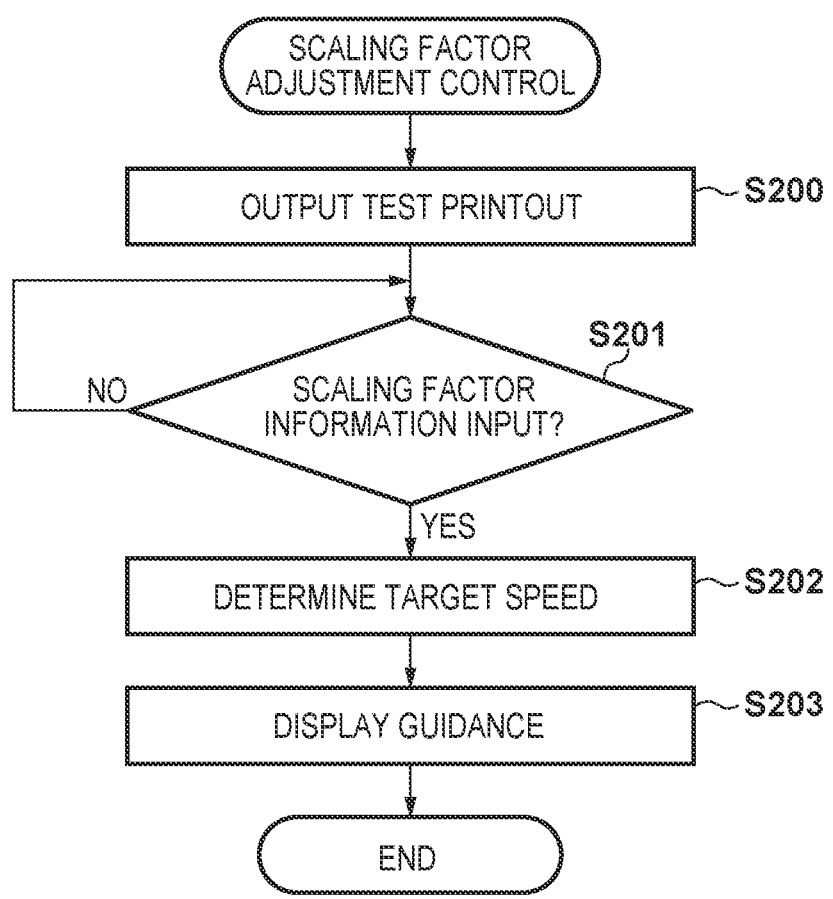
FIG. 14 is a flowchart of scaling factor adjustment control.

FIG. 14 is a flowchart diagram of scaling factor adjustment control. When the user has issued an instruction for executing the scaling factor adjustment control by operating the operation panel 180, the CPU 10 causes the display unit 180A to display the setting screen of FIG. 12A. Then, when the key button 1820 has been pressed, the CPU 10 outputs a test printout by controlling the printer unit 101 (step S200). In step S200, the CPU 10 causes the pattern generator 24 to output test image data. As a result, the image forming units 120, 121, 122, and 123 form a test image on a sheet. As shown in FIG. 13, the test image is a magenta image formed on the entire face of a printing area of the sheet. The sheet on which the test image has been fixed is the test printout.

Furthermore, when the user has pressed the key button 1820, the screen on the operation panel 180 makes a transition to the screen of FIG. 12B. After the test printout is output in step S200, the CPU 10 waits until information related to a sub scanning scaling factor is input from the operation panel 180 (step S201). When the "OK" key 1825 has been pressed on the setting screen of FIG. 12B, the CPU 10 obtains the information of the sub scanning scaling factor input by the user, and processing of the scaling factor adjustment control proceeds to step S202.

Based on the information related to the sub scanning scaling factor obtained in step S201, the CPU 10 determines the target rotation speed of the polygon mirror 205 (step S202). Note that conversion from the information of the sub scanning scaling factor into the target rotation speed of the polygon mirror is computed using, for example, a predetermined computation formula. In this conversion, for example, an amount of change in the target rotation speed may be converted based on the information of the sub scanning scaling factor with reference to a table. After determining the target rotation speed in step S202, the CPU 10 causes the display unit 180A to display the screen shown in FIG. 12C (step S203), and ends processing of the scaling factor adjustment control. Note that it is permissible to adopt a configuration in which the color registration adjustment control is automatically started when the scaling factor adjustment control has ended, in addition to display of the message that suggests the user to execute the color registration adjustment control as shown in FIG. 12C.

Figure 15:
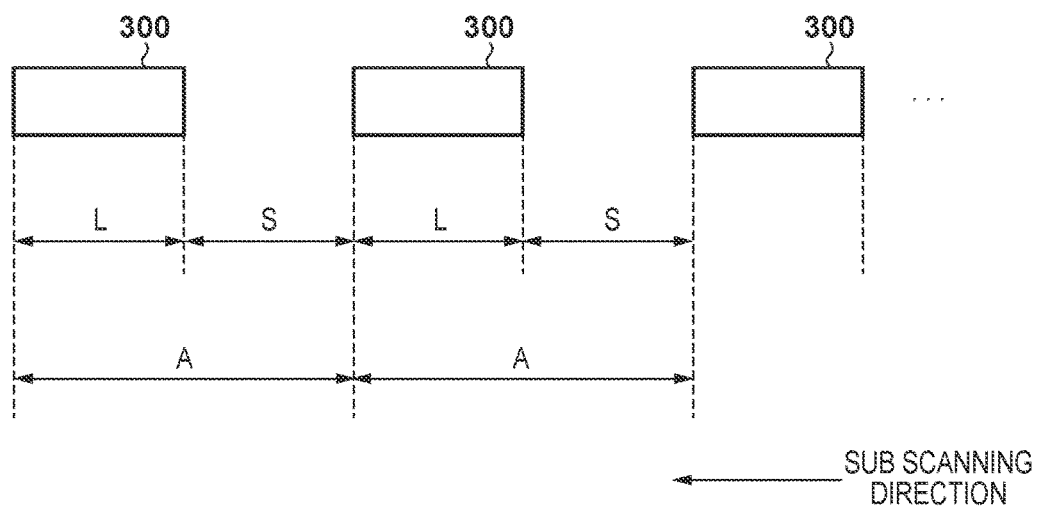
FIG. 15 is a diagram for describing a method of forming a plurality of pattern images.

Next, a description will be given of the reason why the interval between neighboring pattern images 300 is adjusted in accordance with the target rotation speed of the polygon mirror 205 in the color registration adjustment control. Through the scaling factor adjustment control, the length of an image formed on the intermediate transfer belt 106 in the sub scanning direction is adjusted by adjusting the rotation speed of the polygon mirror 205. The rotation speed of the polygon mirror 205 is adjusted based on a scaling factor in the sub scanning direction. Specifically, reducing the rotation speed of the polygon mirror 205 will increase the length of an image formed on the intermediate transfer belt 106 in the sub scanning direction, whereas increasing the rotation speed of the polygon mirror 205 will reduce the length of an image formed on the intermediate transfer belt 106 in the sub scanning direction. The same goes for the length in the sub scanning direction of an interval which extends between images to be formed and in which no toner image is formed. That is to say, changing the rotation speed of the polygon mirror 205 will change a length L of pattern images 300 in the sub scanning direction and an interval S between continuous pattern images 300 as shown in FIG. 15. As a result, a distance A between a pattern image 302 in pattern images 300 and a pattern image 302 in subsequent pattern images 300 changes as well. Here, in the present embodiment, the circumferential speed of the intermediate transfer belt 106 is constant. Therefore, in one cycle of the speed fluctuation of the intermediate transfer belt 106, the distance over which the surface of the intermediate transfer belt 106 moves is constant regardless of the rotation speed of the polygon mirror 205.

As stated earlier, in the color registration adjustment control, in order to suppress the influence of the speed fluctuation of the circumferential speed of the intermediate transfer belt 106, the plurality of pattern images 300 are formed at an equal interval at distances over which the surface of the intermediate transfer belt 106 moves between the integral multiples of the speed fluctuation cycle of the intermediate transfer belt 106. For example, in an example of FIG. 8, ten sets of pattern images 300 are formed at an equal interval at distances corresponding to nine cycles of the speed fluctuation of the intermediate transfer belt 106. Here, as the speed fluctuation cycle of the intermediate transfer belt 106 is constant, the distance A in FIG. 15 needs to be constant regardless of the rotation speed of the polygon mirror 205.

Figure 16:
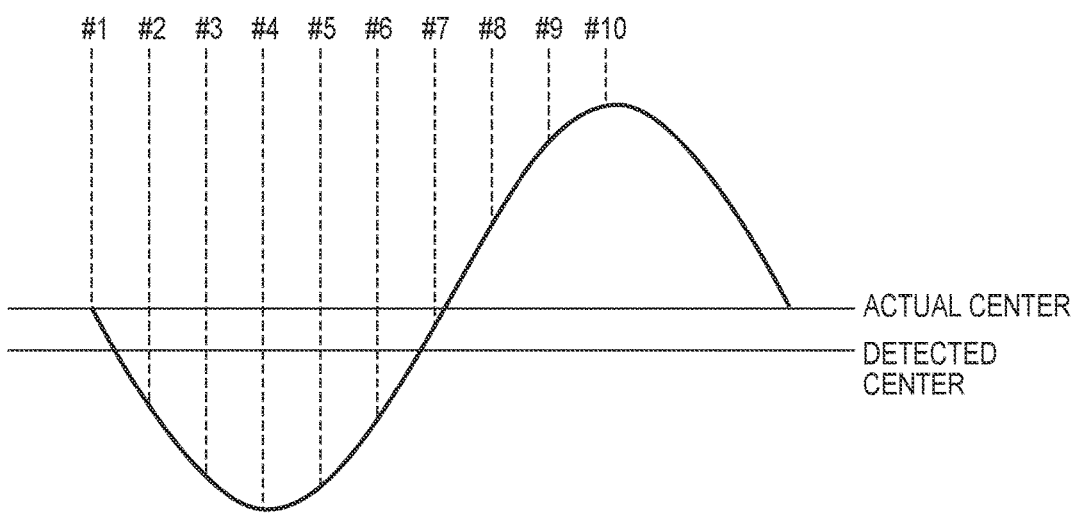
FIG. 16 is a diagram for describing the amounts of color misregistration for a case where the interval between a plurality of pattern images is not adjusted.

Here, for example, assume a case where ten sets of pattern images 300 have been formed without adjusting the interval S between the pattern images 300 in the color registration adjustment control after the rotation speed of the polygon mirror 205 is increased. In this case, the distance A of the pattern images 300 (FIG. 15) decreases. As a result, as shown in FIG. 16, the forming positions of the pattern images 300 become different from the ideal forming positions for correcting the speed fluctuation of the intermediate transfer belt. Accordingly, the average amounts of color misregistration detected from the ten sets of pattern images 300 become different from the actual amounts of color misregistration.

Figure 9B:
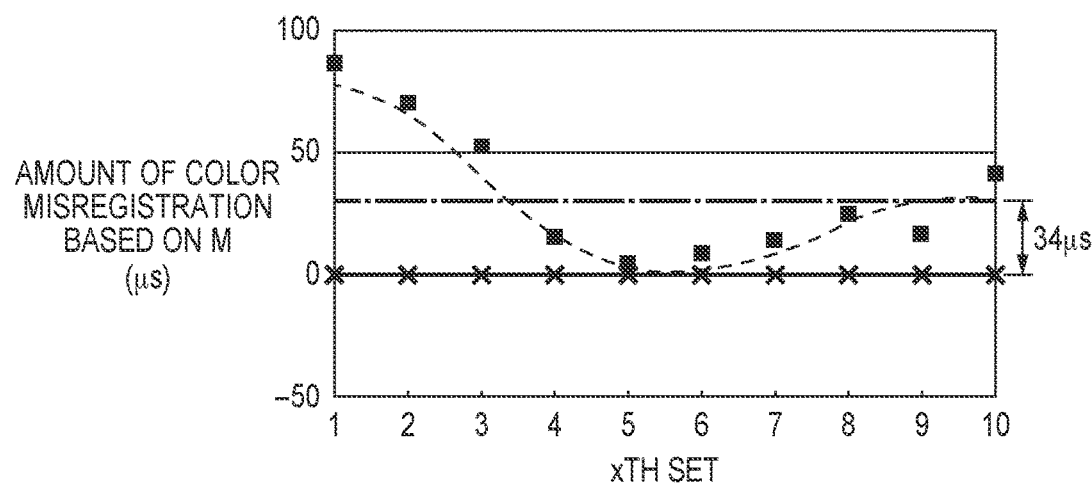

FIG. 9B shows the result of executing color registration adjustment by forming pattern images 300 without adjusting the interval therebetween after the rotation speed of the polygon mirror 205 is changed to a rotation speed higher than the rotation speed of the polygon mirror 205 in FIG. 9A. Although a value obtained by converting an average amount of color misregistration into time is 48 microseconds, an average amount of color misregistration detected is 34 microseconds in an example of FIG. 9B.

In view of this, in the present embodiment, the formation timings of the pattern images 300 are adjusted so that the distance A of the pattern images 300 (FIG. 15) matches a predetermined distance regardless of the rotation speed of the polygon mirror 205. That is to say, the pattern images 300 are formed so that the distance in the sub scanning direction between toner images of the same color included in the pattern images matches a predetermined distance. In a case where the target rotation speed of the polygon mirror 205 has been reduced to increase a scaling factor in the sub scanning direction through the scaling factor adjustment control, the length L of the pattern images 300 increases. Thus, in a case where the target rotation speed of the polygon mirror 205 has been reduced to increase a scaling factor in the sub scanning direction through the scaling factor adjustment control, the image forming apparatus 100 reduces the interval S between the pattern images 300. On the other hand, in a case where the target rotation speed of the polygon mirror 205 has been increased to reduce a scaling factor in the sub scanning direction through the scaling factor adjustment control, the length L of the pattern images 300 decreases. Thus, in a case where the target rotation speed of the polygon mirror 205 has been increased to reduce a scaling factor in the sub scanning direction through the scaling factor adjustment control, the image forming apparatus 100 increases the interval S between the pattern images 300. As a result, the influence of the speed fluctuation of the intermediate transfer belt 106 can be suppressed and color registration adjustment can be executed with high precision regardless of the sub scanning scaling factor set in the scaling factor adjustment control.

Next, a description will be given of a method of determining the interval between the pattern images 300 based on information related to a scaling factor in the sub scanning direction. Note that the dimensions presented in the following description are examples, and are not intended to limit the present invention.

It will be assumed that a diameter ϕ of a driving roller is, for example, 40 [mm]. It will be assumed that the circumferential speed of the intermediate transfer belt 106 is, for example, 300 [mm/sec]. In this case, a period required for single revolution of the driving roller is 40 [mm]×π/300 [mm/sec]≈418.88 [msec]. Furthermore, in a case where ten sets of pattern images 300 are formed on the intermediate transfer belt 106, the distance A of the pattern images 300 that are continuous in the conveyance direction of the intermediate transfer belt 106 is 418.88 [msec]×9/10×300 [mm/sec]≈113.1 [mm]. Note that in a case where a scaling factor in the sub scanning direction is 100 [%], it will be assumed that the length L of one pattern image 300 in the conveyance direction of the intermediate transfer belt 106 is, for example, 18 [mm]. In this case, the interval S between continuous pattern images 300 is 113.1 [mm]–18 [mm] =95.1 [mm].

If the sub scanning scaling factor increases to 101%, the width of the pattern images will also increase by 1%. That is to say, the width of the pattern images will be 18 [mm]×1.01=18.18 [mm]. In view of this, the CPU 10 determines the interval S' for a case where the target rotation speed of the polygon mirror 205 has been changed based on the following formula (3).

$$S'=A-L\times X/100 \quad (3)$$

A: The distance of pattern images neighboring in the sub scanning direction
L: The length of one pattern image in the sub scanning direction
X: The scaling factor [%] in the sub scanning direction In a case where the sub scanning scaling factor has increased to 101%, the interval S' is 94.92 [mm]. In a case where the sub scanning scaling factor has increased to 101%, the CPU 10 controls the formation timings of the pattern images 300 in the printer unit 101 so that the interval S matches the interval S'. The CPU 10 adjusts the formation timings of the pattern images 300 by, for example, controlling a timing at which a trigger signal for forming one pattern image 300 is input to the printer unit 101.

Second Embodiment

Figure 17:
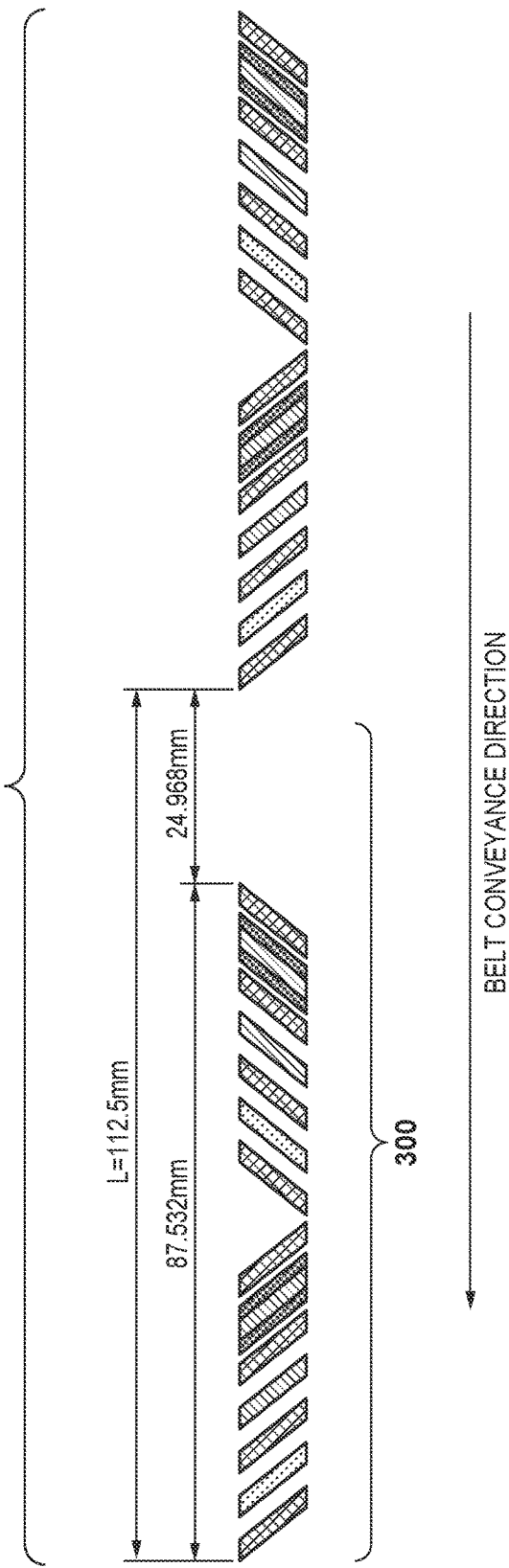
FIG. 17 is a diagram showing examples of the length of and the interval between a plurality of pattern images.

Next, a second embodiment will be described with a focus on differences from the first embodiment. Note that in the following description, it will be assumed that a plurality of pattern images 300 are formed in accordance with the lengths shown in FIG. 17 when the rotation speed of the polygon mirror 205 is a predetermined reference speed. Specifically, it will be assumed that when the rotation speed of the polygon mirror 205 is the reference speed, the length of the pattern images 300 in the sub scanning direction is 87.532 mm, and the length of an area which extends between two continuous pattern images 300 and in which no image is formed is 24.968 mm. At this time, the distance between the lead pattern images 302 in two pattern images 300 that are formed continuously is 112.5 mm. Below, this distance between the lead pattern images 302 in the two pattern images 300 that are formed continuously will simply be referenced as the distance between pattern images. Furthermore, the distance between pattern images 300 for a case where the rotation speed of the polygon mirror 205 is the predetermined reference speed will be referenced as a reference length L. Note that in color registration adjustment according to the present embodiment, it will be assumed that ten pattern images 300 are formed.

Figure 18:
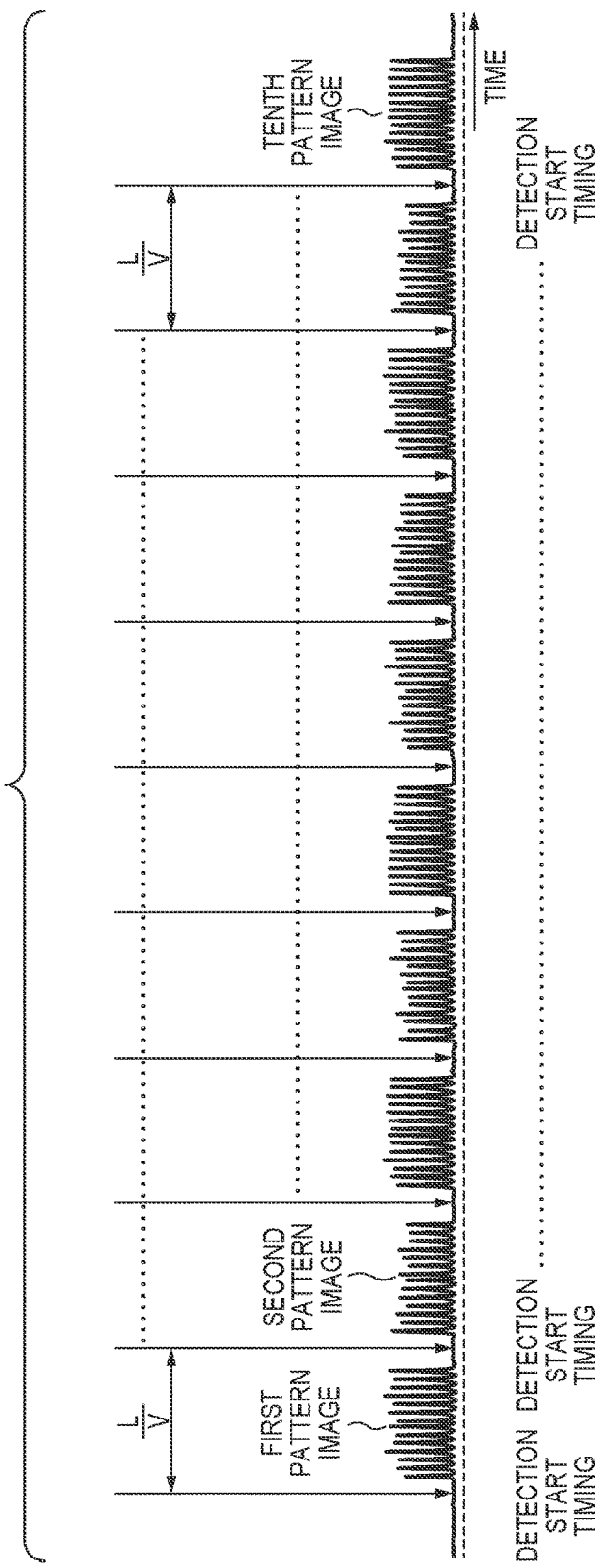
FIG. 18 is a diagram showing detection start timings of pattern images for a case where a scaling factor in a sub scanning direction is a reference value.

FIG. 18 shows a detection start timing of each pattern image 300 in color registration adjustment control for a case where the rotation speed of the polygon mirror 205 is the predetermined reference speed. The detection start timing of the first pattern image 300 is set before the lead magenta pattern image 302 in the first pattern image 300 enters a detection area of the optical sensor 9 based on the timing at which this lead pattern image 302 is formed. As stated earlier, the distance between the second pattern image 300 and the first pattern image 300 is the reference length L=112.5 mm. Therefore, it is sufficient that the detection start timing of the second pattern image 300 be behind the detection start timing of the first pattern image 300 by a period that is obtained by dividing the reference length L=112.5 mm by a process speed V. The same goes for the third to the tenth pattern images 300.

As described above, when the rotation speed of the polygon mirror 205 is the reference speed, the detection start timing is set per period that is obtained by dividing the reference length L by the process speed V. With this configuration, as shown in FIG. 18, detection can be started before the lead pattern image 302 in each pattern image 300 enters the detection area of the optical sensor 9, and each pattern image 300 can be detected accurately.

Figure 19:
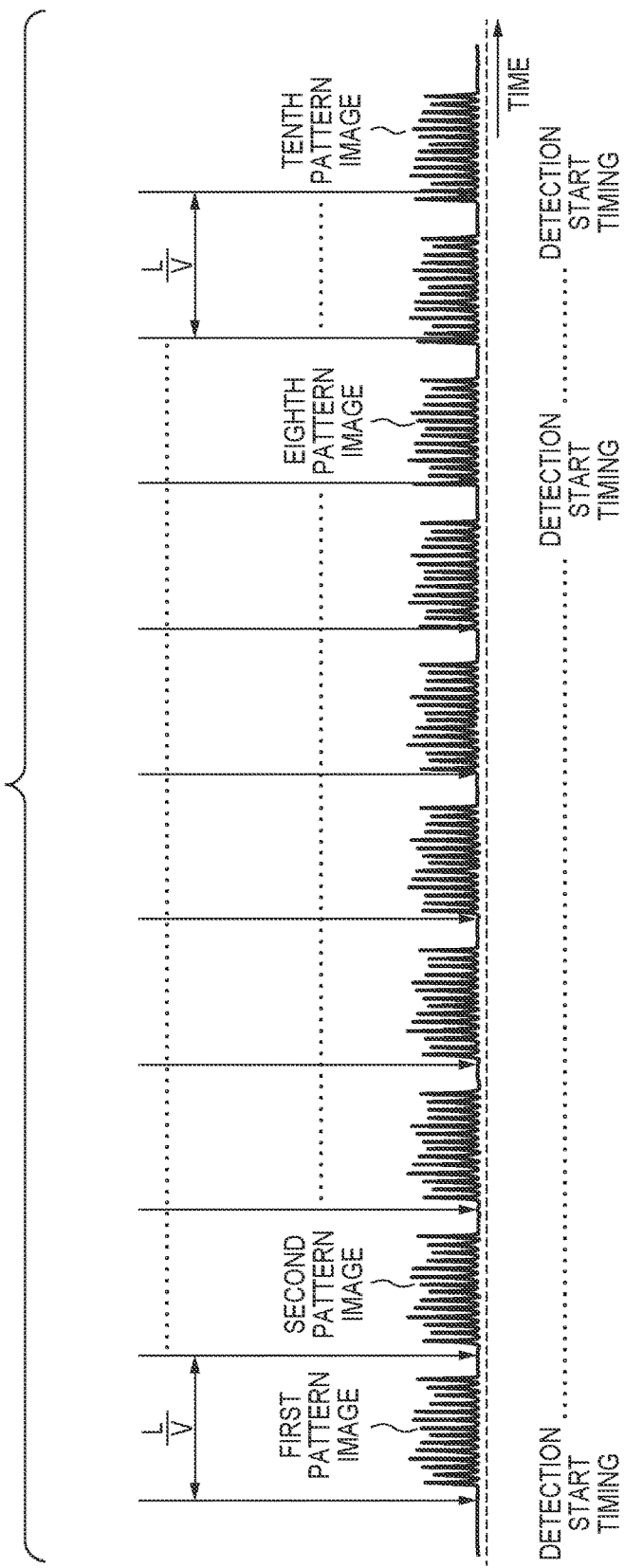
FIG. 19 is a diagram showing detection start timings of pattern images for a case where the scaling factor in the sub scanning direction is different from the reference value.

On the other hand, FIG. 19 shows a case where the rotation speed of the polygon mirror 205 in an exposure unit 3 has been increased by 1% compared to the predetermined reference speed. When the rotation speed of the polygon mirror has been increased compared to the predetermined reference speed, the length of the pattern images 300 becomes shorter than 87.532 mm, and the length of an area which extends between neighboring pattern images 300 and in which no image is formed also becomes shorter than 24.968 mm. That is to say, the distance between two neighboring pattern images 300 becomes shorter than the reference length L=112.5 mm.

Therefore, if the detection start timing of each pattern image 300 is determined based on the period that is obtained by dividing the reference length L by the process speed V, the difference between the detection start timing and the timing at which the lead pattern image 302 in the pattern image 300 enters the detection area of the optical sensor 9 decreases as shown in FIG. 19. In FIG. 19, the detection start timing of the eighth pattern image 300 is almost the same as the timing at which the lead pattern image 302 in this pattern image 300 enters the detection area of the optical sensor 9.

Furthermore, the detection start timings of the ninth and the tenth pattern images 300 come after the lead pattern image 302 therein has passed through the detection area of the optical sensor 9. Thus, the eighth to the tenth pattern images 300 cannot be detected accurately. In this case, color registration adjustment is executed by averaging the amounts of color misregistration obtained from the first to the seventh pattern images 300 that were detected accurately, but the precision of color registration adjustment deteriorates because the influence of eccentricity of the driving roller 6 cannot be offset with high precision.

Figure 20:
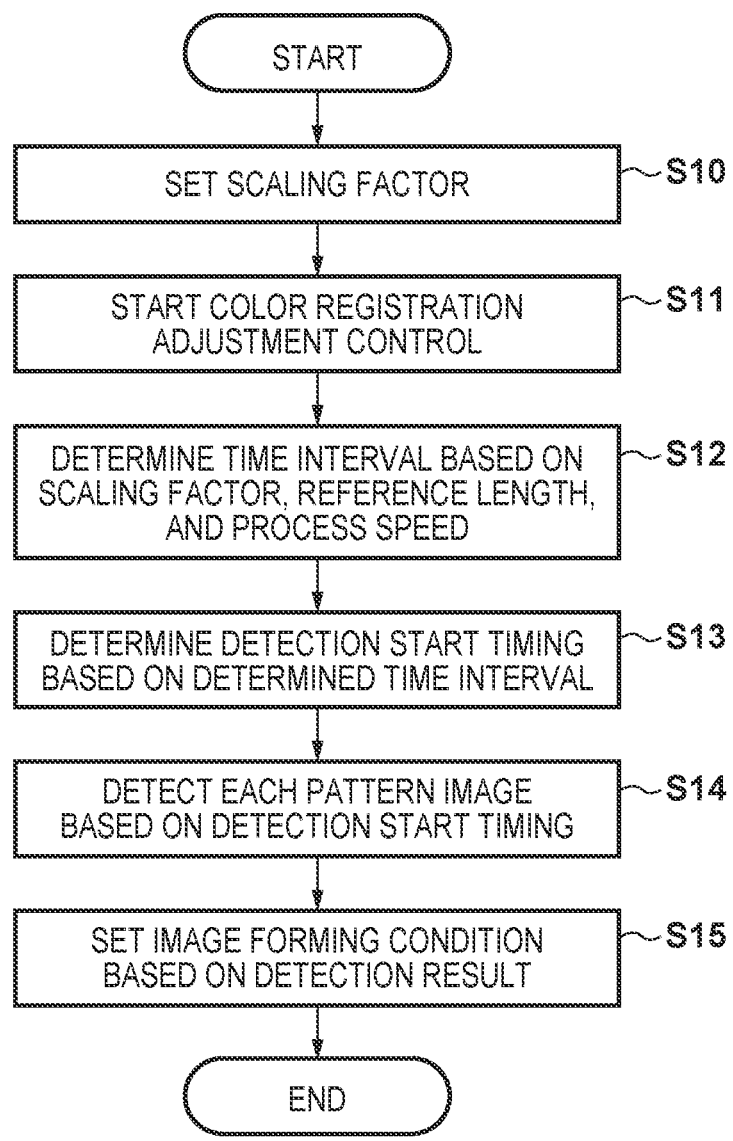
FIG. 20 is a flowchart of color registration adjustment control.

For this reason, in the present embodiment, a time interval between the detection start timings is determined at the time of color registration adjustment in consideration of a scanning speed, that is to say, a set value of the rotation speed of the polygon mirror 205. FIG. 20 is a flowchart of color registration adjustment control according to the present embodiment. In step S10, a user sets a scaling factor for polygon sub scanning scaling on the image forming apparatus via the operation panel 180. The scaling factor is set as, for example, a percentage (%) of a speed change from the reference speed. When a set value of the scaling factor for polygon sub scanning scaling has been changed, the CPU 10 starts the color registration adjustment control in step S11. Along with the start of color registration adjustment, the CPU 10 forms each pattern image 300 on the intermediate transfer belt 106, and determines a time interval between the detection start timings of the pattern images 300 in step S12. The CPU 10 determines the detection start timing of each of the plurality of pattern images 300 based on the scaling factor. Specifically, it will be assumed that the reference length between two neighboring pattern images 300 is L, and the process speed is V In an example of FIG. 17, the reference length L=112.5 mm. Furthermore, it will be assumed that the set value of the scaling factor that was set by the user in relation to the rotation speed of the polygon mirror 205 in step S10 is −x (%). That is to say, it will be assumed that the distance between two neighboring pattern images 300 is increased by x % compared to the reference length L. In this case, the CPU 10 obtains a time interval I between the detection start timings using the following formula.

$$I=(L(1+x/100))/V \quad (4)$$

Thereafter, the CPU 10 determines the detection start timing of each pattern image 300 based on the detection start timing of the first pattern image 300 and the time interval I obtained in step S12 in step S13, and detects each pattern image 300 in step S14. Then, in step S15, the CPU 10 sets an image forming condition related to the image forming positions based on average values of the amounts of color misregistration obtained from each pattern image 300.

As described above, color registration adjustment can be executed with high precision by determining the detection start timing of each pattern image in accordance with a set value of a scaling factor for polygon sub scanning scaling.

Third Embodiment

Next, a third embodiment will be described with a focus on differences from the second embodiment. In the present embodiment, the image forming apparatus has an image quality priority mode and a productivity priority mode in order to improve the image quality after transfer in secondary transfer. In the present embodiment, the intermediate transfer belt 106 is driven to rotate at a first speed that is equal to a process speed. In the productivity priority mode, the secondary transfer belt 114 is driven to rotate at a second speed that is lower than the first speed. On the other hand, in the image quality priority mode, the secondary transfer belt 114 is driven to rotate at a third speed that is lower than the second speed. It has been experimentally found that, when the speed of the secondary transfer belt 114 is set to the third speed that is lower than the second speed, the surface speed of the intermediate transfer belt 106 is also influenced, and the surface speed of the intermediate transfer belt 106 becomes a fourth speed that is lower than the first speed, namely, the process speed.

Figure 21:
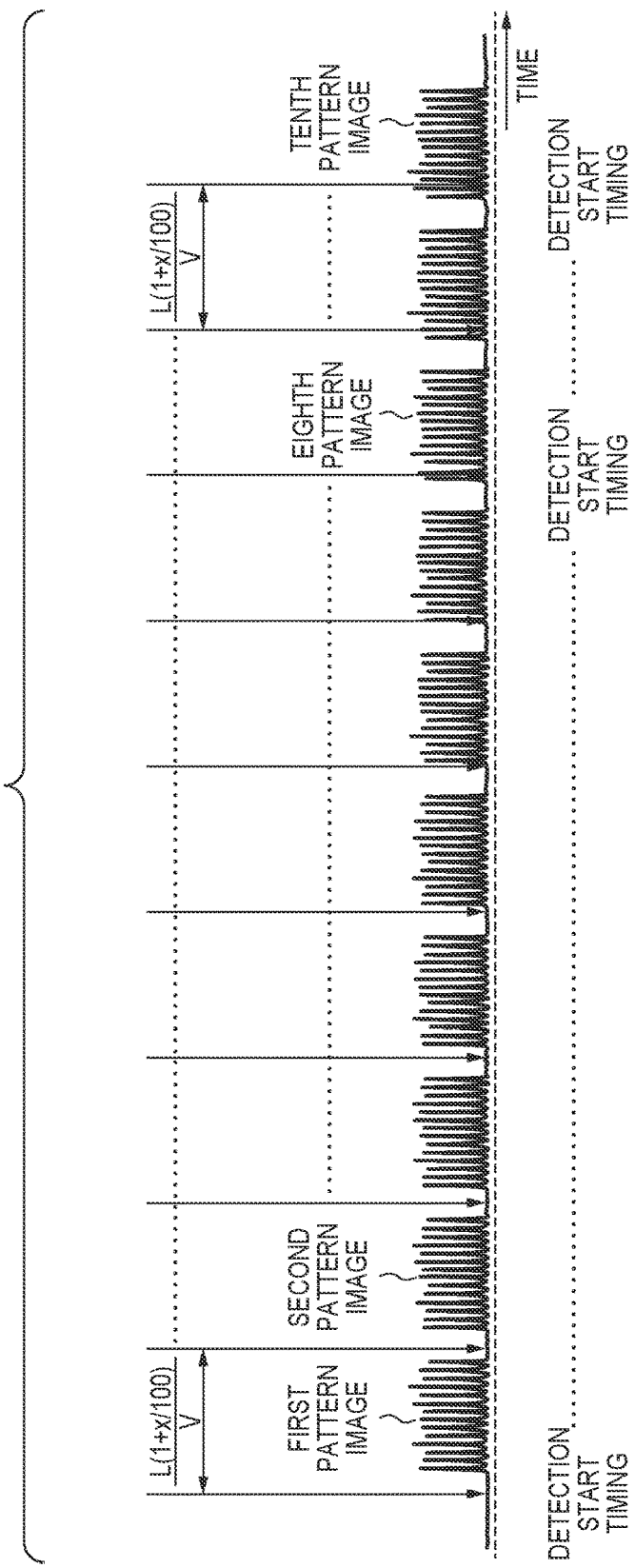
FIG. 21 is a diagram showing detection start timings of pattern images for a case where the speed of a secondary transfer belt has been changed.

FIG. 21 shows detection start timings in a state where the rotation speed of the polygon mirror 205 has been increased by 1% compared to a reference value and the speed of the secondary transfer belt 114 has been set to the third speed. Note that FIG. 21 depicts a case where a time interval I between the detection start timings has been determined in accordance with the formula (4) of the second embodiment. As described above, as the speed of the secondary transfer belt 114 has been set to the third speed that is lower than the second speed, the moving speed of the surface of the intermediate transfer belt 106 also decreases accordingly. As a result, the length of pattern images 300 transferred to the intermediate transfer belt 106, as well as the distance between neighboring pattern images 300, decreases. Thus, when the detection start timing of each pattern image 300 has been set based on the time interval I obtained in accordance with the formula (4), the difference between the detection start timing and the timing at which the lead pattern image 302 in each pattern image 300 enters the detection area of the optical sensor 9 gradually decreases. If the detection start timing comes after the timing at which the lead pattern image 302 enters the detection area of the optical sensor 9, the pattern images 300 cannot be detected accurately. In FIG. 21, the eighth to the tenth pattern images 300 cannot be detected.

Figure 22:
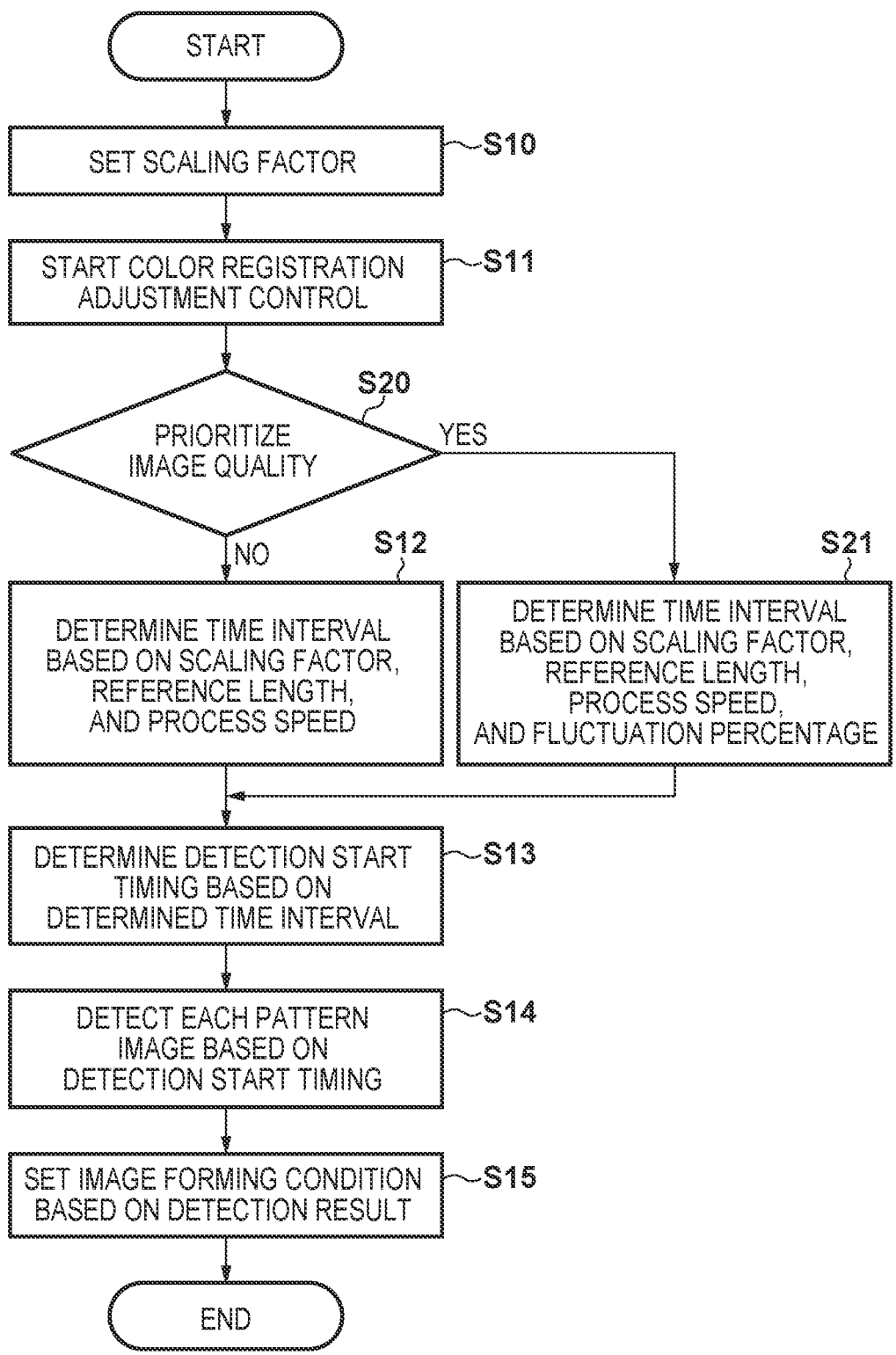
FIG. 22 is a flowchart of color registration adjustment control.

FIG. 22 is a flowchart according to the present embodiment; the processes that are similar to those according to the second embodiment shown in FIG. 20 will be given the same reference signs, and a description thereof will be omitted. In the present embodiment, once color registration adjustment has been started in step S11, the CPU 10 determines whether an image forming mode is the image quality priority mode in step S20. If the image forming mode is not the image quality priority mode, the CPU 10 sets the speed of the secondary transfer belt 114 to the second speed. Then, the processes of steps S12 to S15 are executed similarly to the second embodiment.

On the other hand, if it is determined that the image forming mode is the image quality priority mode in step S20, the CPU 10 sets the speed of the secondary transfer belt 114 to the third speed, and obtains the time interval I between the detection start timings based on the following formula in step S21.

$$I=(L(1-\alpha/100)(1+x/100))/V \quad (5)$$

In the formula (5), L is the reference length, and V is the process speed. Furthermore, x (%) is a percentage of a change in the length in the sub scanning direction of an image that is formed in accordance with a set value of the rotation speed of the polygon mirror 205 set by the user relative to the reference length L. In addition, a fluctuation percentage α (%) is a compensation coefficient corresponding to a fluctuation, which is caused by setting the speed of the secondary transfer belt 114 to the third speed, from the time interval for a case where the speed of the secondary transfer belt 114 is the second speed. Specifically, as the speed of the secondary transfer belt 114 is set to the third speed, the surface speed of the intermediate transfer belt 106 becomes the fourth speed that is lower than the first speed, namely the process speed. When the surface speed of the intermediate transfer belt 106 has become the fourth speed, the length of the pattern images 300 transferred from the photosensitive drum 105 to the intermediate transfer belt 106 in the conveyance direction, as well as the interval therebetween, decreases. On the other hand, when the surface speed of the intermediate transfer belt 106 has become the fourth speed, a period in which the pattern images 300 move by a unit distance increases. The fluctuation percentage α (%) is a coefficient that compensates for these two fluctuations, and is obtained experimentally in advance. Note that the fluctuation percentage a (%) may merely indicate the extent of the decrease in the length of the pattern images 300 transferred from the photosensitive drum 105 to the intermediate transfer belt 106 in the conveyance direction when the surface speed of the intermediate transfer belt 106 has become the fourth speed. In this case, the denominator in the formula (5) is the fourth speed, instead of the process speed V that is equal to the first speed. Note that the fourth speed can also be obtained experimentally in advance. In any case, the time interval between the detection start timings can be obtained by dividing the distance between the pattern images 300 formed on the intermediate transfer belt 106 in accordance with the set value of the rotation speed of the polygon mirror 205 (the scaling factor) and the moving speed of the secondary transfer belt 114 by the moving speed of the secondary transfer belt 114.

Thereafter, the CPU 10 sets the detection start timing of each pattern image 300 in step S13 based on the time interval obtained in step S21, and executes the processes of steps S14 and S15 similarly to the second embodiment.

With the foregoing configuration, color registration adjustment can be executed with high precision even if the speed of the secondary transfer belt 114 is changed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-097515, filed on May 16, 2017 and Japanese Patent Application No. 2017-130520, filed on Jul. 3, 2017, which are hereby incorporated by reference herein in their entirety.

What is claimed is:

1. An image forming apparatus, comprising:
   a conveyance unit configured to convey a sheet;
   a setting unit configured to set a scaling factor in a conveyance direction of the sheet;
   a first image forming unit configured to form a first image of a first color, the first image being scaled based on the scaling factor, the first image forming unit including:
      a first photosensitive member;
      a first exposure unit having a first light source and a first deflector configured to deflect a first light beam from the first light source to scan the first photosensitive member with the first light beam, and being configured to expose the first photosensitive member with the first light beam deflected by the first deflector to form a first electrostatic latent image; and
      a first developing unit configured to develop the first electrostatic latent image on the first photosensitive member with toner of the first color;
   a second image forming unit configured to form a second image of a second color different from the first color, the second image being scaled based on the scaling factor, the second image forming unit including:
      a second photosensitive member;
      a second exposure unit having a second light source and a second deflector configured to deflect a second light beam from the second light source to scan the second photosensitive member with the second light beam, and being configured to expose the second photosensitive member with the second light beam deflected by the second deflector to form a second electrostatic latent image; and
      a second developing unit configured to develop the second electrostatic latent image on the second photosensitive member with toner of the second color;
   an intermediate transfer member on which the first image and the second image are formed;
   a transfer portion at which the first image and the second image are transferred from the intermediate transfer member to the sheet;
   a sensor unit configured to measure a plurality of color patterns, including a color pattern of the first color and a color pattern of the second color, on the intermediate transfer member; and
   a controller configured to:
      control the first image forming unit and the second image forming unit to form a first plurality of color patterns and a second plurality of color patterns, the first plurality of color patterns being scaled based on the scaling factor, the second plurality of color patterns being scaled based on the scaling factor, and the second plurality of color patterns being adjacent to the first plurality of color patterns in the conveyance direction, determine a first timing to start a measurement of the first plurality of color patterns by the sensor unit, determine a second timing to start a measurement of the second plurality of color patterns by the sensor unit based on the scaling factor, control the sensor unit to measure the first plurality of color patterns based on the first timing, control the sensor unit to measure the second plurality of color patterns based on the second timing, detect color misregistration related to the color pattern of the first color and the color pattern of the second color based on a measurement result of the first plurality of color patterns and a measurement result of the second plurality of color patterns, and control a relative position between the first image to be formed by the first image forming unit and the second image to be formed by the second image forming unit based on the detected color misregistration.

2. The image forming apparatus according to claim 1, wherein an interval between scanning lines of the first light beam deflected by the first deflector is adjusted based on the scaling factor, and wherein an interval between scanning lines of the second light beam deflected by the second deflector is adjusted based on the scaling factor.

3. The image forming apparatus according to claim 1, wherein the first exposure unit has a first motor configured to drive and rotate the first deflector, the second exposure unit has a second motor configured to drive and rotate the second deflector, a rotation speed of the first deflector is adjusted based on the scaling factor, and a rotation speed of the second deflector is adjusted based on the scaling factor.

4. The image forming apparatus according to claim 1, wherein the controller is configured to execute scaling factor adjustment control for adjusting the scaling factor, and in a case where the scaling factor adjustment control is executed, the controller is configured to form a test image on another sheet using the first image forming unit and the second image forming unit, and control whether to change the scaling factor.

5. The image forming apparatus according to claim 1, further comprising a display unit, wherein the controller is configured to execute scaling factor adjustment control for adjusting the scaling factor, in a case where the scaling factor adjustment control is executed, the controller is configured to form a test image on another sheet using the first image forming unit and the second image forming unit, and control whether to change the scaling factor, and after executing the scaling factor adjustment control, the controller is configured to display a screen for suggesting detection of the color misregistration on the display unit.

6. The image forming apparatus according to claim 1, further comprising a rotative member configured to rotate while pressing the sheet against the intermediate transfer member so that the sheet passes through the transfer portion, wherein the controller is configured to control a rotation speed of the rotative member in order to adjust a difference between a circumferential speed of the intermediate transfer member and a circumferential speed of the rotative member.

7. The image forming apparatus according to claim 6, wherein the circumferential speed of the rotative member is lower than the circumferential speed of the intermediate transfer member.

8. The image forming apparatus according to claim 6, wherein the circumferential speed of the intermediate transfer member is controlled to be a predetermined speed.

9. The image forming apparatus according to claim 6, wherein the controller is configured to obtain information related to an amount of adjustment of the difference, and control the rotation speed of the rotative member based on the obtained information.

10. The image forming apparatus according to claim 6, wherein the rotation speed of the rotative member is controlled based on a basis weight of the sheet.

11. An image forming apparatus, comprising:

a conveyance unit configured to convey a sheet;

a setting unit configured to set a scaling factor in a conveyance direction of the sheet;

a first image forming unit configured to form a first image of a first color, the first image being scaled based on the scaling factor, the first image forming unit including:

a first photosensitive member;

a first exposure unit having a first light source and a first deflector configured to deflect a first light beam from the first light source to scan the first photosensitive member with the first light beam, and being configured to expose the first photosensitive member with the first light beam deflected by the first deflector to form a first electrostatic latent image; and a first developing unit configured to develop the first electrostatic latent image on the first photosensitive member with toner of the first color;

a second image forming unit configured to form a second image of a second color different from the first color, the second image being scaled based on the scaling factor, the second image forming unit including:

a second photosensitive member;

a second exposure unit having a second light source and a second deflector configured to deflect a second light beam from the second light source to scan the second photosensitive member with the second light beam, and being configured to expose the second photosensitive member with the second light beam deflected by the second deflector to form a second electrostatic latent image; and a second developing unit configured to develop the second electrostatic latent image on the second photosensitive member with toner of the second color;

an intermediate transfer member on which the first image and the second image are formed;

a transfer portion at which the first image and the second image are transferred from the intermediate transfer member to the sheet;

a sensor unit configured to measure a plurality of color patterns, including a color pattern of the first color and a color pattern of the second color, on the intermediate transfer member; and a controller configured to:

determine, based on the scaling factor, an interval between a first plurality of color patterns and a second plurality of color patterns that is to be formed so as to neighbor the first plurality of color patterns in the conveyance direction, control the first image forming unit and the second image forming unit to form the first plurality of color patterns and the second plurality of color patterns based on the determined interval, the first plurality of color patterns being scaled based on the scaling factor, and the second plurality of color patterns being scaled based on the scaling factor, control the sensor unit to measure the first plurality of color patterns and the second plurality of color patterns, detect color misregistration related to the color pattern of the first color and the color pattern of the second color based on a measurement result of the first plurality of color patterns and a measurement result of the second plurality of color patterns, and control a relative position between the first image to be formed by the first image forming unit and the second image to be formed by the second image forming unit based on the detected color misregistration.

12. The image forming apparatus according to claim 11, wherein an interval between scanning lines of the first light beam deflected by the first deflector is adjusted based on the scaling factor, and wherein an interval between scanning lines of the second light beam deflected by the second deflector is adjusted based on the scaling factor.

13. The image forming apparatus according to claim 11, wherein the first exposure unit has a first motor configured to drive and rotate the first deflector, the second exposure unit has a second motor configured to drive and rotate the second deflector, a rotation speed of the first deflector is adjusted based on the scaling factor, and a rotation speed of the second deflector is adjusted based on the scaling factor.

14. The image forming apparatus according to claim 11, wherein the controller is configured to execute scaling factor adjustment control for adjusting the scaling factor, and in a case where the scaling factor adjustment control is executed, the controller is configured to form a test image on another sheet using the first image forming unit and the second image forming unit, and control whether to change the scaling factor.

15. The image forming apparatus according to claim 11, further comprising a display unit, wherein the controller is configured to execute scaling factor adjustment control for adjusting the scaling factor, in a case where the scaling factor adjustment control is executed, the controller is configured to form a test image on another sheet using the first image forming unit and the second image forming unit, and control whether to change the scaling factor, and after executing the scaling factor adjustment control, the controller is configured to display a screen for suggesting detection of the color misregistration using the display unit.

16. The image forming apparatus according to claim 11, further comprising a rotative member configured to rotate while pressing the sheet against the intermediate transfer member so that the sheet passes through the transfer portion, wherein the controller is configured to control a rotation speed of the rotative member in order to adjust a difference between a circumferential speed of the intermediate transfer member and a circumferential speed of the rotative member.

17. The image forming apparatus according to claim 16, wherein the circumferential speed of the rotative member is lower than the circumferential speed of the intermediate transfer member.

18. The image forming apparatus according to claim 16, wherein the circumferential speed of the intermediate transfer member is controlled to be a predetermined speed.

19. The image forming apparatus according to claim 16, wherein the controller is configured to obtain information related to an amount of adjustment of the difference, and control the rotation speed of the rotative member based on the obtained information.

20. The image forming apparatus according to claim 16, wherein the rotation speed of the rotative member is controlled based on a basis weight of the sheet.

* * * * *